(12) United States Patent
Liu et al.

(10) Patent No.: US 12,110,986 B2
(45) Date of Patent: Oct. 8, 2024

(54) ACTUATING MEMBER AND REVERSING VALVE

(71) Applicant: BYD COMPANY LIMITED, Guangdong (CN)

(72) Inventors: Wence Liu, Shenzhen (CN); Guoqing Sun, Shenzhen (CN); Meijiao Ye, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 143 days.

(21) Appl. No.: 17/992,993

(22) Filed: Nov. 23, 2022

(65) Prior Publication Data
US 2023/0098030 A1 Mar. 30, 2023

Related U.S. Application Data

(63) Continuation of application No. PCT/CN2021/096335, filed on May 27, 2021.

(30) Foreign Application Priority Data

May 29, 2020 (CN) .......................... 202010477942.4
May 29, 2020 (CN) .......................... 202010477944.3

(51) Int. Cl.
*F16K 31/524* (2006.01)
*F16K 11/14* (2006.01)
(Continued)

(52) U.S. Cl.
CPC ........ *F16K 31/52416* (2013.01); *F16K 11/14* (2013.01); *F16K 11/161* (2013.01);
(Continued)

(58) Field of Classification Search
CPC ............ F16K 31/52416; F16K 11/165; F16K 31/047; F16K 11/161; F16K 27/0263;
(Continued)

(56) References Cited

U.S. PATENT DOCUMENTS

| 1,606,232 | A | * | 11/1926 | Jentsch | ................. | F16K 11/165 |
| | | | | | | 137/630.16 |
| 2,376,022 | A | * | 5/1945 | Wolcott | ................ | F16K 11/165 |
| | | | | | | 137/636.1 |

(Continued)

FOREIGN PATENT DOCUMENTS

| AU | 6312073 A | 3/1974 |
| CN | 2063191 U | 10/1990 |

(Continued)

OTHER PUBLICATIONS

International Search Report and Written Opinion for Application No. PCT/CN2021/096335, mailed on Jul. 23, 2021, 10 pages.

*Primary Examiner* — Craig M Schneider
*Assistant Examiner* — Christopher D Ballman

(57) ABSTRACT

An actuating member is provided. The actuating member acts on a valve core rod. A guide surface is arranged on the actuating member. A guide path is formed on the guide surface. The guide surface is configured to slidably abut against a top end of the valve core rod, so that the top end of the valve core rod selectively abuts against a position on the guide path at a different height, so as to adjust a position of the valve core rod in a valve port of a reversing valve, thereby changing a flow area at the valve port.

17 Claims, 13 Drawing Sheets

(51) Int. Cl.
  *F16K 11/16* (2006.01)
  *F16K 27/02* (2006.01)
  *F16K 31/04* (2006.01)
  *F16K 31/54* (2006.01)

(52) U.S. Cl.
  CPC .......... *F16K 11/165* (2013.01); *B60Y 2200/91* (2013.01); *F16K 27/0263* (2013.01); *F16K 31/04* (2013.01); *F16K 31/047* (2013.01); *F16K 31/524* (2013.01); *F16K 31/54* (2013.01)

(58) Field of Classification Search
  CPC .......... F16K 31/54; F16K 31/04; F16K 11/14; F16K 31/524; B60Y 2200/91
  See application file for complete search history.

(56) References Cited

U.S. PATENT DOCUMENTS

| | | | | |
|---|---|---|---|---|
| 2,614,851 A * | 10/1952 | Parker | .................. | F16K 11/202 137/630.2 |
| 2,624,586 A * | 1/1953 | Onasch | ................. | F16K 11/165 137/636.1 |
| 4,220,175 A * | 9/1980 | Keller, III | ............. | F16K 11/165 137/630.2 |
| 4,287,908 A * | 9/1981 | Storgard | ............ | F02M 37/0088 137/563 |
| 4,301,830 A * | 11/1981 | Keller, III | ............... | F16K 11/18 251/297 |
| 4,570,663 A * | 2/1986 | Gould | ................... | F16K 11/166 137/630.2 |
| 4,747,424 A * | 5/1988 | Chapman | .............. | B66F 11/048 137/868 |
| 4,957,137 A * | 9/1990 | Wang | ................ | F16K 31/52416 137/454.6 |
| 5,007,446 A * | 4/1991 | Grove | ................... | F16K 11/027 251/5 |
| 5,009,251 A * | 4/1991 | Pike | .................. | F16K 31/52416 137/561 A |
| 5,052,438 A * | 10/1991 | Wang | .................... | F16K 11/165 137/613 |
| 5,067,359 A * | 11/1991 | Flaig | ..................... | A61M 39/28 251/263 |
| 6,247,498 B1 * | 6/2001 | Chapman | .............. | B66F 11/048 254/8 R |
| 6,708,726 B2 * | 3/2004 | Hashimoto | ............. | F16K 31/04 251/251 |
| 6,918,408 B2 * | 7/2005 | Hara | ................. | F16K 31/52416 137/870 |
| 7,922,152 B2 * | 4/2011 | Hara | ..................... | F16K 11/165 251/263 |
| 10,024,219 B2 * | 7/2018 | Lee | .................... | F16K 31/52416 |
| 10,550,756 B1 | 2/2020 | Lee | | |
| 10,704,703 B2 * | 7/2020 | Lee | ...................... | F16K 31/047 |
| 10,753,505 B2 * | 8/2020 | Lee | ...................... | F16K 31/046 |
| 10,851,700 B2 * | 12/2020 | Lee | .......................... | F01P 7/165 |
| 10,890,100 B2 * | 1/2021 | Lee | .......................... | F01P 3/20 |
| 2003/0150495 A1 | 8/2003 | Hara | | |
| 2008/0169026 A1 * | 7/2008 | Sanchez | ................ | F16K 11/052 137/1 |
| 2012/0279462 A1 * | 11/2012 | Warnery | .................. | F01P 7/167 137/554 |
| 2021/0116048 A1 * | 4/2021 | Alali | .................... | F16K 27/0254 |
| 2021/0207728 A1 * | 7/2021 | Alali | ....................... | F16K 11/22 |

FOREIGN PATENT DOCUMENTS

| | | |
|---|---|---|
| CN | 3543828 | 7/2006 |
| CN | 2851751 Y | 12/2006 |
| CN | 2921491 Y | 7/2007 |
| CN | 101059179 A | 10/2007 |
| CN | 201031975 Y | 3/2008 |
| CN | 202691142 U | 1/2013 |
| CN | 103068490 A | 4/2013 |
| CN | 109210238 A | 1/2019 |
| CN | 110905649 A | 3/2020 |
| CN | 113738913 A | 12/2021 |
| CN | 113738914 A | 12/2021 |
| CN | 113738915 A | 12/2021 |
| CN | 113738916 A | 12/2021 |
| DE | 3705162 A1 | 8/1987 |
| DE | 4009562 A1 | 10/1991 |
| JP | S4912425 A | 2/1974 |
| JP | H0211278 A | 1/1990 |
| JP | H0633503 A | 2/1994 |
| JP | 2011075070 A | 4/2011 |
| JP | 2014226626 A | 12/2014 |
| JP | 2017060950 A | 3/2017 |
| KR | 101724235 B1 | 4/2017 |
| KR | 101734246 B1 | 5/2017 |
| KR | 20170135282 A | 12/2017 |
| KR | 20170135285 A | 12/2017 |
| WO | 9911956 A1 | 3/1999 |

* cited by examiner

ACTUATING MEMBER AND REVERSING VALVE

CROSS-REFERENCE TO RELATED APPLICATIONS

The application is a continuation application of International Patent Application No. PCT/CN2021/096335 filed with the China National Intellectual Property Administration (CNIPA) on May 27, 2021, which is based on and claims priority to and benefits of Chinese Patent Application No. 202010477942.4, filed by BYD Co. Ltd. on May 29, 2020 and entitled "REVERSING VALVE", and Chinese Patent Application No. 202010477944.3, filed by BYD Co. Ltd. on May 29, 2020 and entitled "REVERSING VALVE". The above-referenced applications are incorporated herein by reference in their entirety.

FIELD

The present disclosure relates to the field of thermal management systems for electric vehicles, and more specifically, to an actuating member and a reversing valve.

BACKGROUND

A thermal management system for an electric vehicle generally includes a coolant circulation system composed of a heat exchanger, a storage kettle, an electric pump, an electronic valve, an air conditioner, a PTC heater, a radiator, and so on. The coolant is supplied, through pipes, to cool or heat a power battery pack, a motor, a motor controller, a heater core body, and the like. The electronic valve is configured to switch a flow direction of the coolant. Only one PTC heater is arranged in some vehicles. When the external ambient temperature is relatively low, the PTC heater is required to provide the heated coolant for the heater core body and the power battery pack. In this case, it is necessary to properly distribute the coolant outputted from the PTC heater. However, the current electronic valve generally can only switch the flow direction of the liquid. Therefore, the requirements for distribution of the coolant cannot be satisfied. A more complex pipeline and an additional valve are required for realizing the fluid distribution, so as to improve the complexity of the system.

SUMMARY

A first object of the present disclosure is to provide an actuating member. The actuating member can drive a valve core rod to move, so that a reversing valve can switch a flow direction of a liquid and also can perform flow distribution on the liquid flowing through the reversing valve.

A guide surface is arranged on the actuating member. A guide path is formed on the guide surface. The guide surface is configured to slidably abut against a top end of the valve core rod, so that the top end of the valve core rod selectively abuts against a position on the guide path at a different height, to adjust a position of the valve core rod in a valve port of a reversing valve, thereby changing a cross sectional flow area at the valve port.

According to an embodiment of the present disclosure, the guide surface is an arcuate guide surface.

According to an embodiment of the present disclosure, a first guide portion and a second guide portion with different heights are located on the guide surface. The first guide portion is located at a highest point on the guide path. The second guide portion is arranged at a lowest point on the guide path.

The first guide portion is configured to abut against and be engaged with the top end of the valve core rod, and the second guide portion is configured to abut against and be engaged with the top end of the valve core rod, so that the valve core rod opens or blocks the valve port.

According to an embodiment of the present disclosure, the first guide portion is configured in such a way that the valve port is in a completely opened state when the first guide portion abuts against and is engaged with the top end of the valve core rod, and the valve core rod blocks the valve port when the second guide portion abuts against and is engaged with the top end of the valve core rod.

According to an embodiment of the present disclosure, a gradual transition is realized between the first guide portion and the second guide portion through a smooth surface.

According to an embodiment of the present disclosure, the smooth surface is an arcuate surface or an inclined surface.

According to an embodiment of the present disclosure, at least two first guide portions are arranged, and at least two second guide portions are arranged.

According to an embodiment of the present disclosure, a cam transmission mechanism is jointly formed by the valve core rod and the actuating member. The guide surface is an arcuate guide surface. The arcuate guide surface includes two first guide portions and two second guide portions. The two first guide portions and the two second guide portions are spaced apart to jointly form four guide paths. Each of the guide paths is configured to be engaged with the valve core rod.

According to an embodiment of the present disclosure, projections of the two first guide portions and the two second guide portions on a plane perpendicular to an axial direction of a rotating shaft of the actuating member are located on a same circumference.

According to an embodiment of the present disclosure, the two first guide portions are symmetric with respect to a center of the rotating shaft. The two second guide portions are symmetric with respect to the center of the rotating shaft. Each of the first guide portions is spaced apart from both of the two adjacent second guide portions at an angle of 90°.

According to an embodiment of the present disclosure, an annular protrusion is arranged on the actuating member around the rotating shaft. The actuating member further includes a reinforcing rib. One end of the reinforcing rib is connected with the annular protrusion, and another end of the reinforcing rib is connected with a side wall of the guide path.

According to an embodiment of the present disclosure, two sets of reinforcing ribs are arranged. Each set of reinforcing ribs include multiple reinforcing ribs arranged at intervals in a circumferential direction. One set of reinforcing ribs are located on one side of a line connecting the two second guide portions, and the other set of reinforcing ribs are located on an other side of the line connecting the two second guide portions.

According to an embodiment of the present disclosure, a rack structure is arranged on the actuating member. The rack structure is configured to drive-engaged with a gear to drive the actuating member to translate. The first guide portion and the second guide portion are spaced apart along a translation direction of the actuating member.

A second object of the present disclosure is to provide a reversing valve, including a valve body, a valve core assembly, and an actuating assembly. An inlet, at least two outlets, and an internal flow channel that connects the inlet with multiple outlets are formed on the valve body. A valve port engaged with the valve core assembly is formed on the internal flow channel. The valve port is in a one-to-one correspondence with the valve core assembly. The valve core assembly is movably arranged on the valve body. The actuating assembly is configured to actuate the valve core assembly, so that the inlet is selectively in communication with at least one of the outlets, and the flow distribution is realized by adjusting a cross sectional flow area at the valve port.

According to an embodiment of the present disclosure, the actuating assembly is configured to actuate the valve core assembly, so that the inlet is selectively in complete communication with one of the outlets or in partial communication with all of the plurality of outlets, so as to realize the flow distribution by adjusting the cross sectional flow area at the valve port.

According to an embodiment of the present disclosure, a fluid distributor is formed on the internal flow channel. A separation cylinder is arranged in the fluid distributor to separate the fluid distributor into a first accommodating cavity and a second accommodating cavity. The valve port is formed as an opening of the separation cylinder. The first accommodating cavity is in communication with the second accommodating cavity through the valve port. One of the first accommodating cavity and the second accommodating cavity is always in communication with the inlet on the internal flow channel where such accommodating cavity is located. The other of the first accommodating cavity and the second accommodating cavity is always in communication with the outlet on the internal flow channel where such accommodating cavity is located.

According to an embodiment of the present disclosure, the actuating assembly includes an actuating member and an elastic member. The valve core assembly includes a valve core rod. The valve core rod movably extends through the valve port. The elastic member is connected between the valve body and the valve core rod to provide an elastic force for causing the valve core rod to open the valve port. The actuating member acts on the valve core rod, so that the valve core rod gradually blocks the valve port.

According to an embodiment of the present disclosure, the actuating assembly includes an actuating member and an elastic member. The valve core assembly includes a valve core rod movably extending through the valve port along an axial direction of the valve core assembly. The elastic member is connected between the valve body and the valve core rod to provide an elastic force for causing the valve core rod to open the valve port. The actuating member acts on the valve core rod, so that the valve core rod overcomes the elastic force and gradually blocks the valve port.

According to an embodiment of the present disclosure, an accommodating cavity in the separation cylinder is the first accommodating cavity. An accommodating cavity between the separation cylinder and an inner wall of the fluid distributor is the second accommodating cavity. The first accommodating cavity is always in communication with the inlet on the internal flow channel where the first accommodating cavity is located. The second accommodating cavity is always in communication with the outlet on the internal flow channel where the second accommodating cavity is located. The valve core rod includes a blocking portion configured to block the valve port. The elastic member is arranged in the separation cylinder. Two ends of the elastic member respectively abut against the blocking portion and a bottom of the separation cylinder.

According to an embodiment of the present disclosure, an annular groove is formed on a periphery of the blocking portion. A seal ring is fixedly arranged in the annular groove, so as to seal the valve port during blocking of the valve port.

According to an embodiment of the present disclosure, the actuating assembly includes an actuating member and an elastic member. The valve core assembly includes a valve core rod movably extending through the valve body. The elastic member is connected between the valve body and the valve core rod to provide an elastic force for causing the valve core rod to block the valve port. The actuating member acts on the valve core rod so that the valve core rod opens the valve port.

According to an embodiment of the present disclosure, the actuating member acts on the valve core rod, so that the valve core rod overcomes the elastic force and gradually opens the valve port, thereby changing the cross sectional flow area at the valve port.

According to an embodiment of the present disclosure, the actuating member is rotatably arranged on the valve body. An arcuate guide surface is arranged on a side of the actuating member facing the valve core rod. The arcuate guide surface has a first guide portion and a second guide portion with different heights. A gradual transition is realized between the first guide portion and the second guide portion through a smooth surface. A guide path is formed between the first guide portion and the second guide portion. Atop end of the valve core rod slidably abuts against the corresponding guide path to jointly form a cam transmission mechanism, so that the valve core rod opens or blocks the valve port.

According to an embodiment of the present disclosure, when the first guide portion abuts against the top end of the valve core rod, the valve core rod overcomes the elastic force and opens the valve port. When the second guide portion abuts against the top end of the valve core rod, the elastic member causes the valve core rod to block the valve port.

According to an embodiment of the present disclosure, the arcuate guide surface has at least two first guide portions and at least two second guide portions. Heights of the at least two first guide portions are different from heights of the at least two second guide portions.

According to an embodiment of the present disclosure, when the first guide portion abuts against the top end of the valve core rod, the valve core rod overcomes the elastic force to block the valve port. When the second guide portion abuts against the top end of the valve core rod, the elastic member causes the valve core rod to open the valve port.

According to an embodiment of the present disclosure, the arcuate guide surface includes two first guide portions and two second guide portions. The first guide portions and the second guide portions are spaced apart to jointly form four guide paths. Each of the guide paths is engaged with the valve core rod.

According to an embodiment of the present disclosure, the arcuate guide surface includes two first guide portions and two second guide portions. The two first guide portions are symmetric with respect to a center of a rotating shaft of the actuating member. The two second guide portions are symmetric with respect to the center of the rotating shaft. The first guide portions and the second guide portions are spaced apart. Projections of the first guide portions and the second guide portions along an axial direction are located on a same circumference. The first guide portions and the second guide portions jointly form four guide paths. Each of the guide paths is engaged with the valve core rod.

According to an embodiment of the present disclosure, two inlets, that is, an inlet A and an inlet C and two outlets, that is, an outlet B, and an outlet D are formed on the valve body. The inlet A is in communication with the outlet B to form a first internal flow channel and is in communication with the outlet D to form a second internal flow channel. When one of the two valve core rods engaged with the first internal flow channel and the second internal flow channel is engaged with one of the first guide portions, the other of the valve core rods is engaged with one of the second guide portions.

The inlet C is in communication with the outlet B to form a third internal flow channel and is in communication with the outlet D to form a fourth internal flow channel. When one of the two valve core rods engaged with the third internal flow channel and the fourth internal flow channel is engaged with the first guide portion, the other of the valve core rods is engaged with the second guide portion.

According to an embodiment of the present disclosure, the inlet A and the inlet C are arranged in parallel, the outlet B and the outlet D are arranged in parallel, and the inlet A and the outlet B are arranged perpendicular to each other. The inlet A, the outlet B, the inlet C, and the outlet D are respectively formed on different side surfaces of the valve body.

According to an embodiment of the present disclosure, the valve core assembly includes the valve core rod movably extending through the valve body. A stepped hole is arranged on the valve body, and the top end of the valve core rod extends through the stepped hole.

According to an embodiment of the present disclosure, the valve core assembly includes the valve core rod movably extending through the valve body along the axial direction of the valve core assembly. A stepped hole is arranged on the valve body. The top end of the valve core rod extends through the stepped hole. A sealing member is fixedly arranged in the stepped hole to seal the valve core rod and the valve body.

According to an embodiment of the present disclosure, the reversing valve further includes an actuator assembly. The actuator assembly includes a locking structure and a power device. The power device is drive-connected with the actuating assembly through the locking structure to drive the actuating assembly to move. The locking structure is configured to lock the actuating assembly in its current state.

A third object of the present disclosure is to provide a vehicle, including the reversing valve or the actuating member.

According to the above technical solution, the actuating assembly causes the valve core assembly to block the valve port or to be separated from the valve port, so as to allow or prevent passage of a fluid in the internal flow channel. In this way, the inlet and the outlet on the internal flow channel are blocked or in complete communication, thereby realizing the function of switching the flow direction of the liquid. Alternatively, multiple valve core assemblies partially open the corresponding valve ports through control of the valve core assemblies by the actuating assembly, so that the same inlet can be in communication with all of the multiple outlets. In addition, the valve core assembly causes the cross sectional flow area at the valve port to be changed by controlling an extent to which the valve port is opened, so as to adjust the flow at the valve port. Therefore, by changing the cross sectional flow area at a different valve port of the internal flow channel in communication with the same inlet, the flow distribution can be performed on the liquid flowing into the inlet. Therefore, the reversing valve can be used to distribute the cooling liquid outputted from the PTC heater to the power battery pack and the heater core body respectively according to the required flow.

Other features and advantages of the present disclosure are to be described in detail in the subsequent detailed description.

BRIEF DESCRIPTION OF THE DRAWINGS

The accompanying drawings are provided for further understanding of the present disclosure and constitute a part of the specification, and explain the present disclosure together with the following specific implementations, but do not constitute a limitation to the present disclosure. In the accompanying drawings.

REFERENCE NUMERALS

100—Reversing valve; 10—Valve body; 11—Valve port; 12—Upper valve cover; 121—Stepped hole; 122—Upper cover blocking protrusion; 14—Valve housing; 15—Gland; 20—Valve core assembly; 21—Valve core rod; 211—Shaft rod portion; 212—Blocking portion; 2121—Annular groove; 2122—Seal ring; 30—Actuating assembly; 31—Actuating member; 311—Rotating shaft; 32—Arcuate guide surface; 321—First guide portion; 322—Second guide portion; 333—Guide path; 40—Internal flow channel; 41—Fluid distributor; 411—First accommodating cavity; 412—Second accommodating cavity; 413—Inlet; 414—Outlet; 415—Separation cylinder; 50—Elastic member; 51—First mounting protrusion; 52—Second mounting protrusion; 60—Actuator assembly; 61—Power device; 62—Actuator mounting base; 621—Rotating shaft support sleeve; 71—Sealing member.

DETAILED DESCRIPTION

Specific implementations of the present disclosure are described in detail below with reference to the accompanying drawings. It should be understood that the specific implementations described herein are merely used for describing and illustrating the present disclosure rather than limiting the present disclosure.

Figure 3:
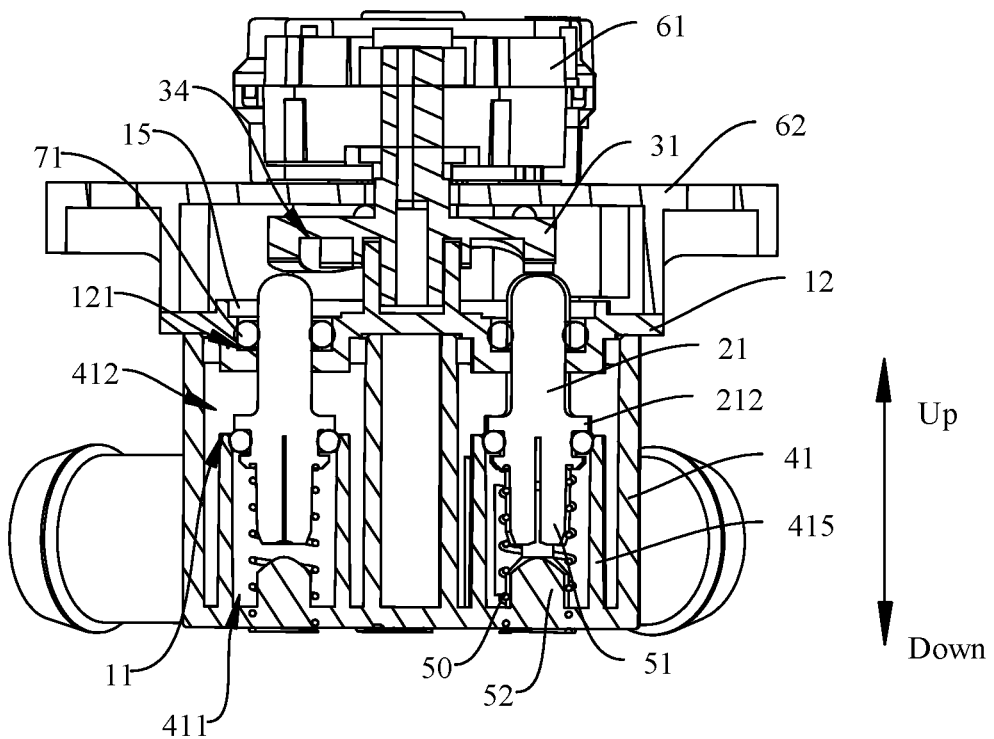
FIG. 3 is a schematic cross-sectional view of a reversing valve according to an implementation of the present disclosure.

In the present disclosure, unless stated to the contrary, for directional terms such as "up and down", reference may be made to a drawing direction shown in FIG. 3. "Top" corresponds to the direction "up" shown in FIG. 3, and "bottom surface" and "bottom" correspond to the direction "down" shown in FIG. 3. "Inside and outside" means inside and outside of a contour of a relevant component. In addition, terms "first", "second", and the like used in the embodiments of the present disclosure are for distinguishing one element from another element, and do not have order and importance.

In order to perform flow distribution on a liquid flowing through the reversing valve, as shown in FIG. 1 to FIG. 11, a reversing valve 100 is provided in the present disclosure. The reversing valve 100 includes a valve body 10, a valve core assembly 20, and an actuating assembly 30. The valve body 10 includes an inlet, at least two outlets, and an internal flow channel 40 that connects the inlet with each outlet. The same inlet may be in communication with multiple outlets. A valve port 11 engaged with the valve core assembly 20 is formed on the internal flow channel 40. The valve port 11 is in a one-to-one correspondence with the valve core assembly 20. The valve core assembly 20 is movably arranged on the valve body 10. The actuating assembly 30 is configured to actuate the valve core assembly 20, so that the inlet is selectively in complete communication with one of the outlets or in partial communication with all of the multiple outlets, and the flow distribution is realized by adjusting a cross sectional flow area at the valve port 11.

As shown in FIG. 2 to FIG. 5, a fluid distributor 41 is formed on the internal flow channel 40. A separation cylinder 415 is arranged in the fluid distributor 41 to separate the fluid distributor 41 into a first accommodating cavity 411 and a second accommodating cavity 412. The valve port 11 is formed as an opening of the separation cylinder 415. The first accommodating cavity 411 is in communication with the second accommodating cavity 412 through the valve port 11. One of the first accommodating cavity 411 and the second accommodating cavity 412 is always in communication with the inlet on the internal flow channel 40 where such accommodating cavity is located. The other of the first accommodating cavity and the second accommodating cavity is always in communication with the outlet on the internal flow channel 40 where such accommodating cavity is located.

The "complete communication" in the present disclosure means communication in a case that the valve port 11 is completely opened and a maximum flow area is formed at the valve port 11.

According to the above technical solution, the actuating assembly 30 causes the valve core assembly 20 to block the valve port 11 or to be separated from the valve port 11, so as to allow or prevent passage of a fluid in the internal flow channel 40. In this way, the inlet and the outlet on the internal flow channel 40 are blocked or in complete communication, thereby realizing the function of switching the flow direction of the liquid. Alternatively, multiple valve core assemblies 20 partially open the corresponding valve ports 11 through the control of the valve core assemblies 20 by the actuating assembly 30, so that the same inlet can be in communication with all of the multiple outlets. In addition, the valve core assembly 20 causes the cross sectional flow area at the valve port 11 to be changed by controlling an extent to which the valve port 11 is opened, so as to adjust the flow at the valve port 11. Therefore, by changing the cross sectional flow area at a different valve port 11 of the internal flow channel 40 in communication with the same inlet, the flow distribution can be performed on the liquid flowing into the inlet. Therefore, the reversing valve 100 can be used to distribute the cooling liquid outputted from the PTC heater to the power battery pack and the heater core body respectively according to the required flow.

No limitation is imposed on how the actuating assembly 30 moves the valve core assembly 20 in the present disclosure, as long as the actuating assembly can move the valve core assembly 20. For example, a linear power source (a linear motor, a hydraulic cylinder, a pneumatic cylinder, or the like) may be arranged at each valve core assembly 20 to drive the valve core assembly 20 to move.

Figure 2:
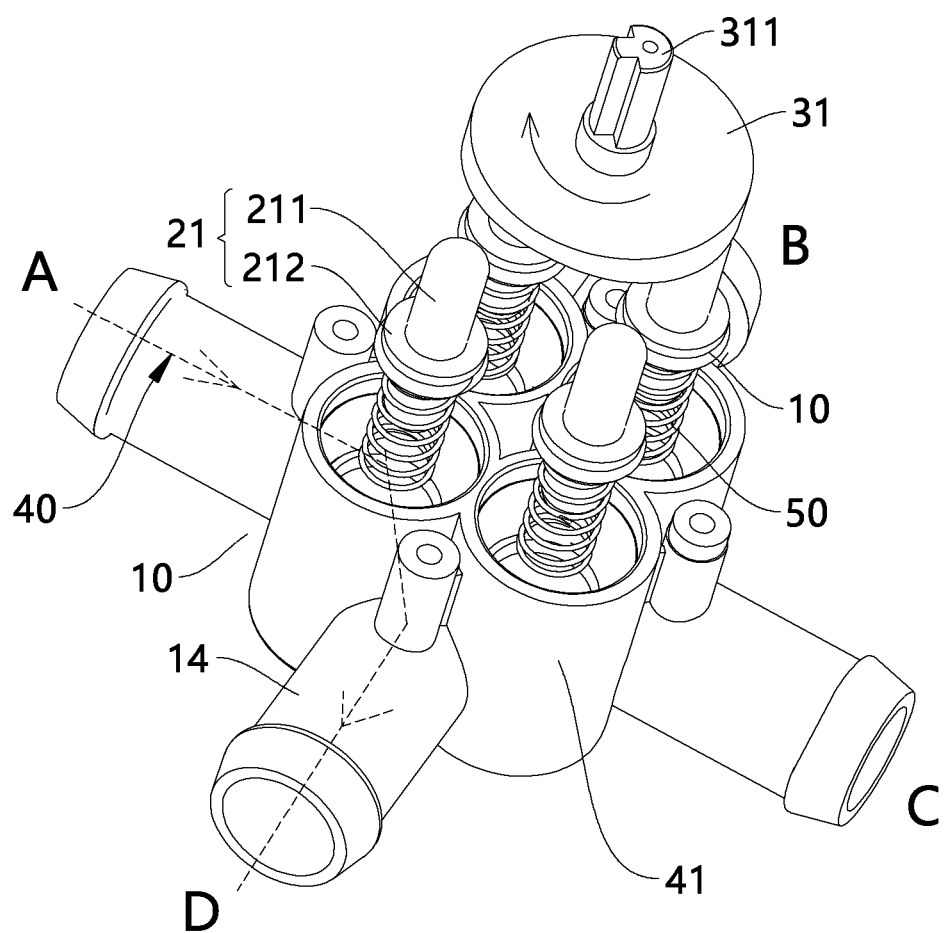
FIG. 2 is a schematic exploded view of a partial structure of a reversing valve according to an implementation of the present disclosure and shows a flow direction of a liquid from an inlet A to an outlet D by a dashed arrow.
Figure 4:
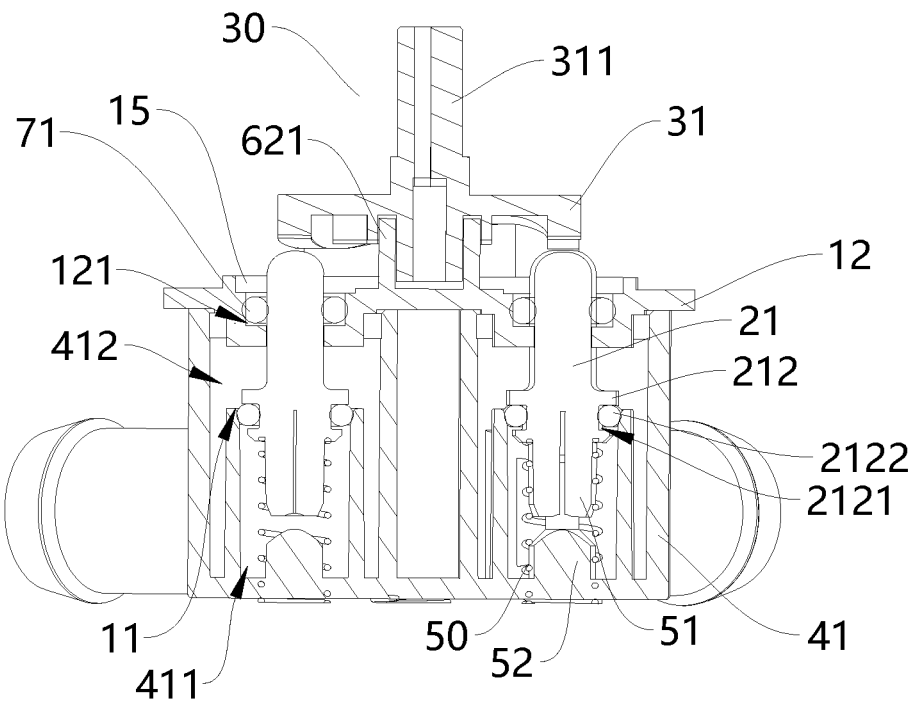
FIG. 4 is a schematic exploded view of a partial structure of a reversing valve according to an implementation of the present disclosure, where an actuator assembly is not shown.

In an implementation of the present disclosure, as shown in FIG. 2 to FIG. 4, the actuating assembly 30 includes an actuating member 31 and an elastic member 50. The valve core assembly 20 includes a valve core rod 21 movably extending through the valve port 11 along an axial direction of the valve core assembly. The elastic member 50 is connected between the valve body 10 and the valve core rod 21 to provide an elastic force for causing the valve core rod 21 to open the valve port 11. The actuating member 31 acts on the valve core rod 21, so that the valve core rod 21 overcomes the elastic force and gradually blocks the valve port 11.

The directions shown in FIG. 3 and FIG. 4 are used as an example for description. The valve core rod 21 moves downward to block the valve port 11, and the valve core rod 21 moves upward to be separated from the valve port 11. The elastic member 50 and the actuating member 31 act on the valve core rod 21. When the valve port 11 is required to be closed, the actuating member 31 acts on the valve core rod 21 to cause the valve core rod 21 to overcome the elastic force to move close to the valve port 11, thereby closing the valve port 11. When the valve port 11 is required to be opened, the actuating member 31 reduces or releases the action on the valve core rod 21, the elastic member 50 causes the valve core rod 21 to move upward, and a blocking portion 212 of the valve core rod 21 gradually leaves the valve port 11, thereby opening the valve port 11, so that the liquid flows from the first accommodating cavity 411 into the second accommodating cavity 412. In addition, a moving distance of the valve core rod 21 may be controlled by the actuating member 31, so that the valve core rod 21 gradually overcomes the acting force of the elastic member 50 to move close to the valve port 11. An extent to which the valve port 11 is opened is adjusted to change the cross sectional flow area at the valve port 11. In this way, the flow in the corresponding internal flow channel 40 is adjusted.

The elastic member 50 may be a compression spring, or may be a common spring, an elastic rubber member, an elastic silicone member, an elastic sheet, or other elastic mechanisms.

An existing electric valve generally has defects such as a large rotational torque, an excessively large operating current, breaking of the rotating shaft 311, and the like. The reversing valve 100 in the present disclosure drives four valve core rods 21 to move up and down through the actuating member 31, which requires a small frictional force and a small required operating current and extends the service life of a product.

Figure 5:
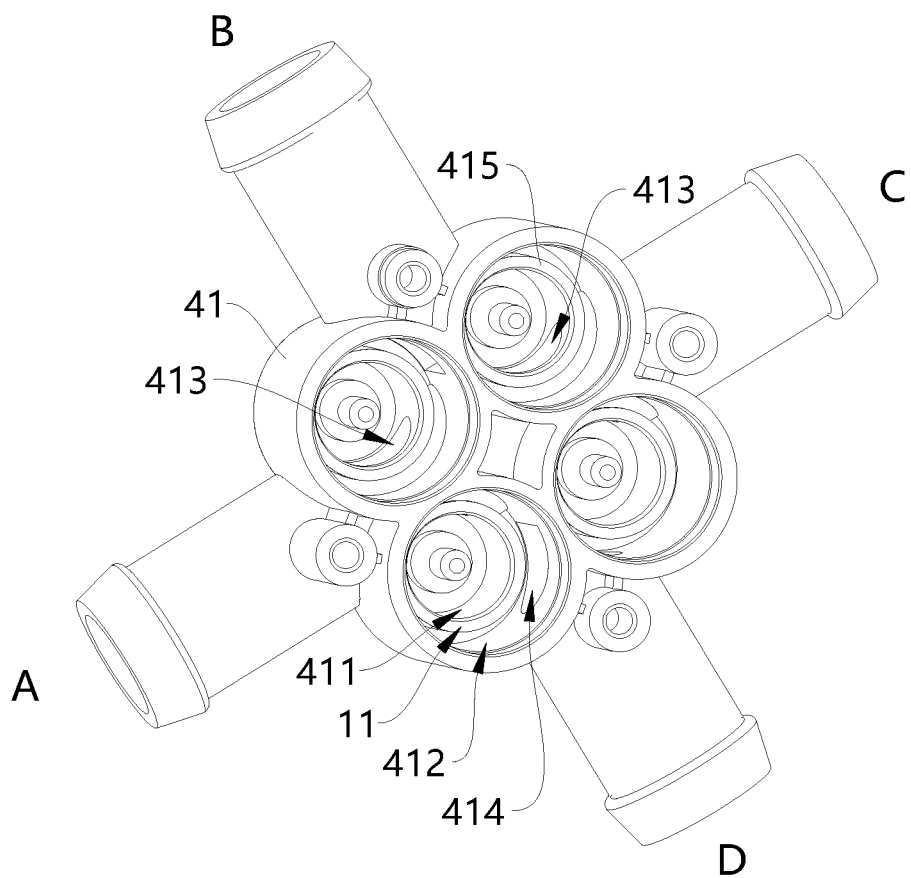
FIG. 5 is a three-dimensional schematic structural diagram of a valve housing of a reversing valve according to an implementation of the present disclosure.

In an implementation of the present disclosure, as shown in FIG. 5, an accommodating cavity in the separation cylinder 415 is the first accommodating cavity 411, and an accommodating cavity between the separation cylinder 415 and an inner wall of the fluid distributor 41 is the second accommodating cavity 412. The first accommodating cavity 411 is always in communication with the inlet on the internal flow channel 40 where the first accommodating cavity is located. The second accommodating cavity 412 is always in communication with the outlet on the internal flow channel 40 where the second accommodating cavity is located. An inlet 413 in communication with the inlet is arranged on the separation cylinder 415, and an outlet 414 in communication with the outlet is formed on a side wall of the fluid distributor 41.

The valve core rod 21 includes a blocking portion 212 configured to block the valve port 11. The blocking portion 212 is configured to block the opening of the separation cylinder 415. The elastic member 50 is arranged in the separation cylinder 415, and two ends of the elastic member 50 respectively abut against the blocking portion 212 and a bottom of the separation cylinder 415. The fluid distributor 41 is generally configured as a hollow cylindrical structure. The separation cylinder 415 is extended upward from a bottom of the cylindrical structure, and the separation cylinder 415 is at a lower position relative to the cylindrical structure.

In an embodiment, a diameter of the blocking portion 212 is greater than a diameter of the valve port 11. The second accommodating cavity 412 is in communication with the outlet, and the first accommodating cavity 411 is always in communication with the inlet. Through a pressure of the liquid flowing into the first accommodating cavity 411 from the inlet, a pressure of the blocking portion 212 away from the valve port 11 is provided, so as to assist the elastic member 50 in opening the blocking portion 212. Therefore, when the elastic force of the elastic member 50 is insufficient, the valve port 11 can still be opened normally, thereby improving the reliability of the reversing valve 100.

In other implementations, the second accommodating cavity 412 is always in communication with the inlet, and the first accommodating cavity 411 is always in communication with the outlet. The elastic member 50 is connected between the valve body 10 and the valve core rod 21 to provide an elastic force for causing the valve core rod 21 to open the valve port 11. The actuating member 31 acts on the valve core rod 21, so that the valve core rod 21 overcomes the elastic force and gradually closes the valve port 11. The blocking portion 212 is configured to block the opening of the separation cylinder 415. The pressure of the liquid flowing into the second accommodating cavity 412 from the inlet causes the blocking portion 212 to be pressed against the valve port 11, so that the blocking portion 212 and the valve port 11 can be engaged more tightly, and leakage is less likely to occur. When the pressure is relatively high, the blocking portion 212 on the valve core rod 21 is pressed tightly and sealed, which greatly increases a pressure value of internal leakage and can fully satisfy a requirement for a pressure difference in an air conditioning system of a vehicle.

Figure 7:
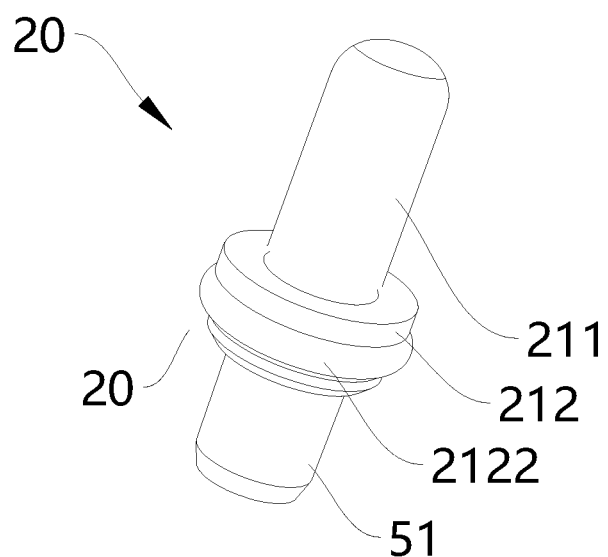
FIG. 7 is a schematic structural diagram of a valve core rod of a reversing valve according to an implementation of the present disclosure, where a seal ring is shown.

In order to improve the sealing performance between the blocking portion 212 and the valve port 11, in one embodiment, as shown in FIG. 3, FIG. 4, and FIG. 7, an annular groove 2121 is formed on a periphery of the blocking portion 212. A seal ring 2122 is fixedly arranged in the annular groove 2121, so as to seal the valve port 11 during blocking of the valve port 11.

In an embodiment, a peripheral surface of the blocking portion 212 may be configured as a conical surface structure. Therefore, when the blocking portion 212 blocks the valve port 11, the valve port 11 can be blocked more tightly through engagement of the conical surface structure and the valve port 11. A top end of the valve core rod 21 is a hemispherical structure, which facilitates sliding of a valve core cap on an arcuate guide surface 32.

Figure 6:
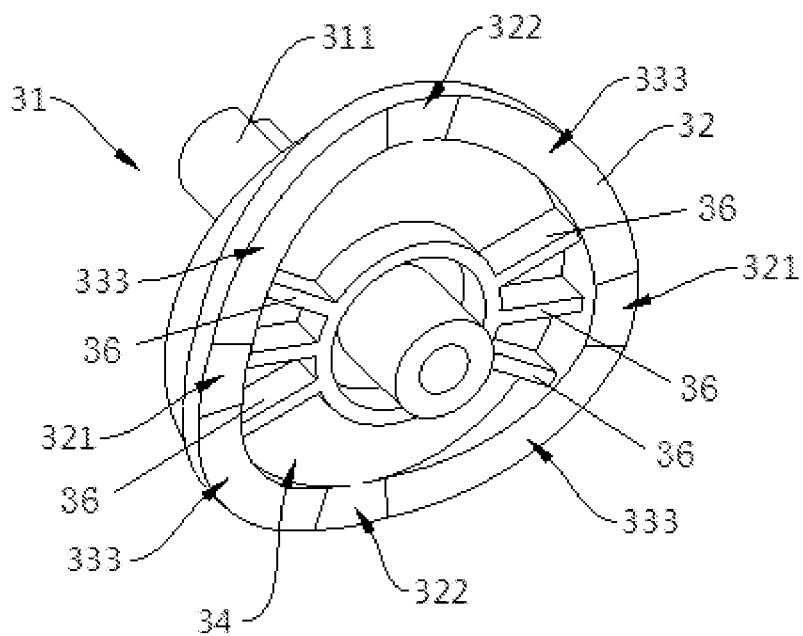
FIG. 6 is a schematic structural diagram of an actuating member of a reversing valve according to an implementation of the present disclosure.

The actuating member 31 should not be limited to any specific structures in the present disclosure, as long as the valve core rod 21 can be actuated to move. In an implementation, as shown in FIG. 6, the actuating member 31 is rotatably arranged on the valve body 10. An arcuate guide surface 32 is arranged on a side of the actuating member 31 facing the valve core rod 21. The arcuate guide surface 32 has first guide portions 321 and second guide portions 322 with different heights. A gradual transition is realized between each of the first guide portions 321 and each of the second guide portions 322 through a smooth surface. A guide path 333 is formed between the first guide portion 321 and the second guide portion 322. A top end of the valve core rod 21 slidably abuts against the corresponding guide path 333 to jointly form a cam transmission mechanism. The valve core rod 21 overcomes the elastic force to block the valve port 11 when the first guide portion 321 abuts against the top end of the valve core rod 21, and the elastic member 50 causes the valve core rod 21 to open the valve port 11 when the second guide portion 322 abuts against the top end of the valve core rod 21. The top end of the valve core rod 21 is an end of the valve core rod 21 close to the actuating member 31. The arcuate guide surface 32 of the actuating member 31 is generally configured as a circular wavy structure. A rotating shaft 311 further protrudes from a side of the actuating member 31 facing the valve body 10, and the actuating member 31 is rotatable around the rotating shaft 311.

The arcuate guide surface 32 has multiple first guide portions 321 and multiple second guide portions 322. In an embodiment, at least two first guide portions 321 and at least two second guide portions 322 are arranged. A guide path 333 is formed between each of the first guide portions 321 and each of the second guide portions 322. Heights of the at least two first guide portions 321 are different from heights of the at least two second guide portions 322.

The first guide portion 321 and the second guide portion 322 respectively protrude from a reference plane of the actuating member 31, and the "height" is a height by which the guide portion protrudes from the reference plane of the actuating member 31. The first guide portion 321 has a maximum height on the guide path 333, and the second guide portion 322 has a minimum height on the guide path 333.

During rotation of the actuating member 31, the top end of the valve core rod 21 slides along the guide path 333. When the top end of the valve core rod 21 abuts against the second guide portion 322, the elastic member 50 causes a largest distance between the blocking portion 212 on the valve core rod 21 and the valve port 11 and a maximum extent to which the valve port 11 is opened. In this case, the valve port 11 is in a completely opened state, the cross sectional flow area at the valve port 11 is the largest, and the corresponding inlet is in complete communication with the outlet. When the top end of the valve core rod 21 slides to the first guide portion 321 along the guide path 333, the first guide portion 321 drives the blocking portion 212 on the valve core rod 21 to block the valve port 11. In this way, the valve port 11 is blocked. When the top end of the valve core rod 21 abuts against the guide path 333 between the first guide portion 321 and the second guide portion 322, the valve port 11 is partially opened, and the extent to which the valve port 11 is opened depends on the height of the guide path 333 against which the valve core rod 21 abuts at this time. Since a gradual transition is realized between the first guide portion 321 and the second guide portion 322 through a smooth surface, the valve port 11 is gradually opened or gradually closed during the rotation of the actuating member 31. Correspondingly, the extent to which the valve port 11 is opened also progressive changes, so that the flow of a liquid flowing through the valve port 11 changes gradually. In this way, the flow in an internal flow channel 40 can be gradually changed, thereby performing flow distribution more accurately.

In other implementations, the actuating member 31 is movably arranged on the valve body 10. The movement of the actuating member 31 is realized through engagement of a gear and a rack. An inclined guide surface is arranged on a bottom surface of the actuating member 31. When the inclined guide surface moves along a horizontal direction, the valve core rod 21 is pushed to move through engagement of the inclined guide surface and the top end of the valve core rod 21, thereby allowing or preventing passage of a fluid in the internal flow channel 40.

In an embodiment, a gradual transition is realized between the first guide portion 321 and the second guide portion 322 through an inclined surface, so as to realize the progressive change of the flow. In other implementations, a gradual transition may further be realized between the first guide portion 321 and the second guide portion 322 through an arcuate surface.

A specific shape of the arcuate guide surface 32 is not limited in the present disclosure, and may be set according to a moving distance and direction of the valve core rod 21 to be actuated. In an implementation of the present disclosure, as shown in FIG. 6, the arcuate guide surface 32 includes two first guide portions 321 and two second guide portions 322. The two first guide portions 321 are symmetric with respect to a center of the rotating shaft 311 of the actuating member 31, and the two second guide portions 322 are symmetric with respect to the center of the rotating shaft 311. The first guide portions 321 and the second guide portions 322 are spaced apart. Projections of the first guide portions and the second guide portions along an axial direction are located on a same circumference. The first guide portions and the second guide portions jointly form four guide paths 333. Each of the guide paths 333 is engaged with the valve core rod 21.

The guide portions are arranged symmetrically with respect to the center of the rotating shaft 311 of the actuating member 31, so that the acting force of the valve core rod 21 on the actuating member 31 can be more balanced and is not easy to skew, and the valve core rod 21 is not easily deformed. In this way, the internal leakage does not occur, and the cooling or heating effect of a thermal management system is improved.

In an embodiment, the projections of the four guide paths 333 along the axial direction are located on the same circumference, so that the top end of the valve core rod 21 can always move along the guide path 333 when the actuating member 31 rotates along the rotating shaft 311.

In an embodiment, each two of the four guide portions are spaced apart from each other at an angle of 90°. In this way, when the actuating member 31 rotates by 90 degrees, the valve core rod 21 engaged with the first guide portion 321 is switched to be engaged with the second guide portion 322, and the valve core rod 21 engaged with the second guide portion 322 is switched to be engaged with the first guide portion 321.

In the present disclosure, the number of inlets and outlets specifically arranged on the valve body 10 is not limited, and can be set as required. In an implementation of the present disclosure, as shown in FIG. 2, two inlets, that is, an inlet A and an inlet C and two outlets, that is, an outlet B and an outlet D are formed on the valve body 10. The inlet A is in communication with the outlet B to form a first internal flow channel 40 and is in communication with the outlet D to form a second internal flow channel 40. When one of the two valve core rods 21 engaged with the first internal flow channel 40 and the second internal flow channel 40 is engaged with the first guide portion 321, the other of the valve core rods 21 is engaged with the second guide portion 322. Therefore, during the rotation of the actuating member 31, the valve core rods 21 in different flow channels in communication with a same inlet move in different directions.

The inlet C is in communication with the outlet B to form a third internal flow channel 40 and is in communication with the outlet D to form a fourth internal flow channel 40. When one of the two valve core rods 21 engaged with the third internal flow channel 40 and the fourth internal flow channel 40 is engaged with the first guide portion 321, the other of the valve core rods 21 is engaged with the second guide portion 322. Therefore, during the rotation of the actuating member 31, the valve core rods 21 in different flow channels in communication with the same inlet move in different directions.

The flow direction of the liquid flowing into the inlet A is used for description. Assuming that in an initial state, the valve core rod 21 in the first internal flow channel 40 is engaged with the first guide portion 321, the first guide portion 321 presses against the blocking portion 212 on the valve core rod 21 to overcome the elastic force and block the valve port 11. In this case, the valve port 11 in the first internal flow channel 40 is closed, and the inlet A and the outlet B are blocked. In the meantime, the valve core rod 21 in the second internal flow channel 40 is engaged with the second guide portion 322, and the elastic member 50 causes the blocking portion 212 on the valve core rod 21 to move away from the valve port 11 in the second internal flow channel 40. In this case, the second internal flow channel 40 is completely opened, and the inlet A is in complete communication with the outlet D. Therefore, the liquid flowing into the valve body 10 from the inlet A flows out from the outlet D.

During the rotation of the actuating member 31, the valve core rod 21 slides along the guide path 333, the blocking portion 212 on the valve core rod 21 engaged with the first internal flow channel 40 gradually moves away from the valve port 11, and the valve port 11 is gradually opened. The cross sectional flow area at the valve port 11 gradually increases, and the flow of the liquid flowing through the valve port 11 gradually increases, so that the flow of the liquid flowing out from the outlet B gradually increases. In the meantime, the blocking portion 212 on the valve core rod 21 engaged with the second internal flow channel 40 moves close to the valve port 11, and the valve port 11 is gradually closed. The cross sectional flow area at the valve port 11 gradually decreases, and the flow of the liquid flowing through the valve port 11 gradually decreases, so that the outlet D is gradually closed, and the flow of the liquid flowing out from the outlet D gradually decreases. In this way, the required flow distribution can be performed on the liquids flowing into the inlet A and respectively flowing out from the outlet B and the outlet D.

When the actuating member 31 continues to rotate, the valve core rod 21 in the first internal flow channel 40 is engaged with the second guide portion 322, and the elastic member 50 causes the blocking portion 212 on the valve core rod 21 to open the valve port 11 in the first internal flow channel 40. In this case, the first internal flow channel 40 is completely opened, and the inlet A and the outlet B are in complete communication. In the meantime, the valve core rod 21 in the second internal flow channel 40 is engaged with the first guide portion 321, and the first guide portion 321 pushes the blocking portion 212 on the valve core rod 21 to block the valve port 11. In this case, the valve port 11 in the second internal flow channel 40 is closed, and the inlet A and the outlet D are blocked, so as to switch the flow direction of the liquid. That is to say, the communication between the inlet A and the outlet D is switched to communication between the inlet A and the outlet B.

It may be understood that the principle of the flow distribution of the liquid flowing into the inlet C is similar to the principle of the flow distribution of the liquid flowing into the inlet A. Details are not described herein again.

Figure 1:
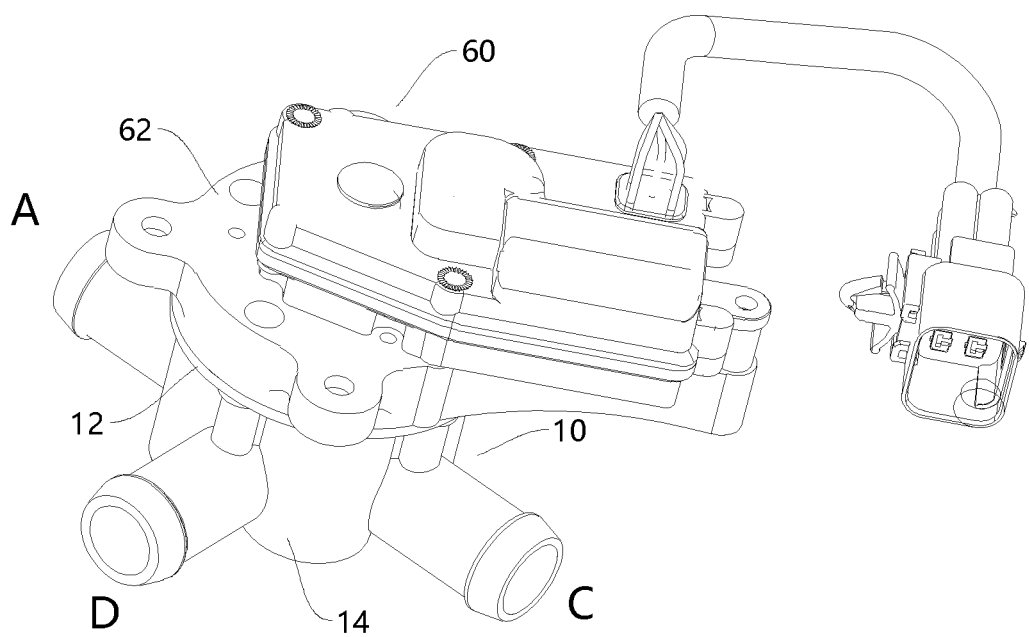
FIG. 1 is a three-dimensional schematic structural diagram of a reversing valve according to an implementation of the present disclosure.

Specific extension directions of the inlet and the outlet are not limited in the present disclosure, and may be set according to an actual mounting requirement. In an implementation, as shown in FIG. 1 and FIG. 2, the inlet A and the inlet C are arranged in parallel, the outlet B and the outlet D are arranged in parallel, and the inlet A and the outlet B are arranged perpendicular to each other. The inlet A, the outlet B, the inlet C, and the outlet D are respectively formed on different side surfaces of the valve body 10. The arrangement of the above parallel structure facilitates the connection between the reversing valve 100 and a pipeline.

In order to prevent the liquid in the internal flow channel 40 from leaking from the valve core rod 21, in an implementation, as shown in FIG. 3 and FIG. 4, the valve core assembly 20 includes the valve core rod 21 movably extending through the valve body 10 along the axial direction of the valve core assembly. A stepped hole 121 is arranged on the valve body 10. The top end of the valve core rod 21 extends through the stepped hole 121. A sealing member 71 is fixedly arranged in the stepped hole 121 to seal the valve core rod 21 and the valve body 10. In an embodiment, the sealing member 71 may be a seal ring 2122.

Compared with a ball valve used in the related art, the flow direction of the liquid is switched by rotating a spherical valve core in the valve body 10, and a rubber sealing member 71 having a larger area is required to seal the valve core and the valve body 10. Due to a relatively large contact area between the spherical valve core and the valve body 10, the abrasion is likely to occur during long-term sliding friction, and leakage is likely to occur after long-term use. In the present disclosure, since the valve core rod 21 is slidably arranged on the valve body 10 along a linear direction, the sealing of a position where the valve core rod 21 is engaged with the valve body 10 can be realized by sealing a position where the valve core rod 21 extends through the valve body 10. A contact area between the valve core rod 21 and the sealing member 71 is relatively small, which can reduce the friction force between the valve core rod and the sealing member, reduce abrasion, and reduce leakage caused by the abrasion of the sealing member 71. In this way, no internal leakage occurs, and the cooling or heating effect of the thermal management system is improved.

The valve core rod 21 should not be limited to any specific structures in the present disclosure. In an implementation, as shown in FIG. 7, a shaft rod portion 211 and a blocking portion 212 are configured as a cross-shaped structure. The shaft rod portion 211 includes a guide section and a first mounting protrusion 51 that are respectively arranged on two sides of the blocking portion 212 and extend in opposite directions along the axial direction. The guide section movably extends through the valve body 10 along the axial direction. The elastic member 50 is arranged in the separation cylinder 415. A second mounting protrusion 52 protrudes from a bottom of the separation cylinder 415. Two ends of the elastic member 50 are respectively sleeved on the first mounting protrusion 51 and the second mounting protrusion 52.

In order to drive the actuating assembly 30 to move, in the present disclosure, as shown in FIG. 3, the reversing valve 100 further includes an actuator assembly 60. The actuator assembly 60 includes a locking structure and a power device 61. The power device 61 is drive-connected with the actuating assembly 30 through the locking structure, so as to drive the actuating assembly 30 to move. The locking structure is configured to lock the actuating assembly 30 in its current state.

The power device 61 may include a stepping motor, and the locking structure may be a worm gear structure and performs self-locking by using self-locking features of the worm gear.

By arranging the actuator assembly 60, when the flow distribution is required, the actuating member 31 may be locked at a certain angle by the locking structure, so that the corresponding valve core rod 21 is in a corresponding opened state. Alternatively, the valve core rod 21 is locked by the locking structure to be engaged with the first guide portion 321 or the second guide portion 322, so that the valve port 11 is kept in a completely opened or blocked state.

Figure 10:
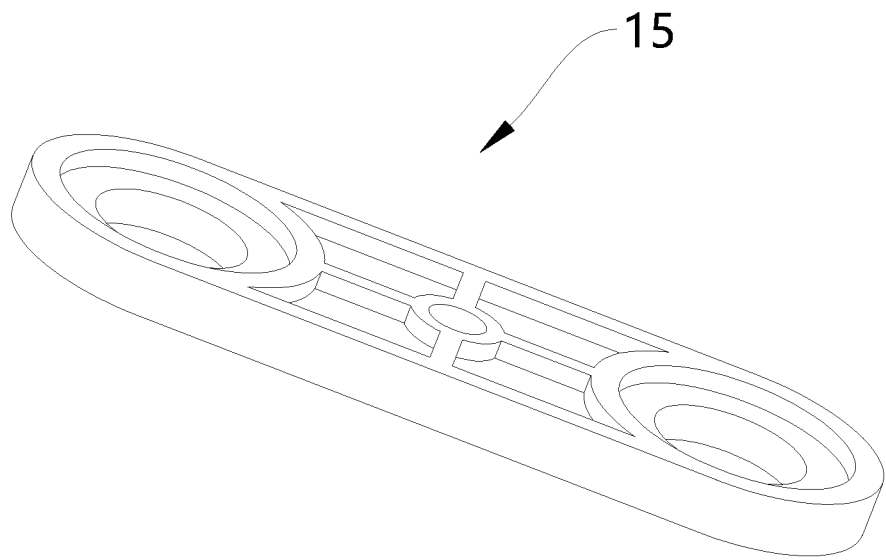
FIG. 10 is a schematic structural diagram of a gland of a reversing valve according to an implementation of the present disclosure.

In an embodiment, as shown in FIG. 3 and FIG. 4, the valve body 10 includes an upper valve cover 12 and a valve housing 14. The internal flow channel 40 is formed in the valve housing 14, and two ends of the fluid distributor 41 are open. The upper valve cover 12 covers an opening on an upper end of the fluid distributor 41. The valve core assembly 20 slidably extends through the upper valve cover 12, the stepped hole 121 is arranged on the upper valve cover 12, and a sealing member 71 is fixedly arranged in the stepped hole 121 to seal the valve core assembly 20 and the upper valve cover 12. The sealing member 71 may be a seal ring 2122. In an embodiment, as shown in FIG. 10, the valve body 10 further includes two glands 15. The glands 15 are arranged on a side of the upper valve cover 12 away from a lower valve cover. Two through holes are provided on each gland 15. The valve core rod 21 extends through the through hole in a one-to-one correspondence. The gland 15 is configured to limit the sealing member 71 in the stepped hole 121.

Figure 8:
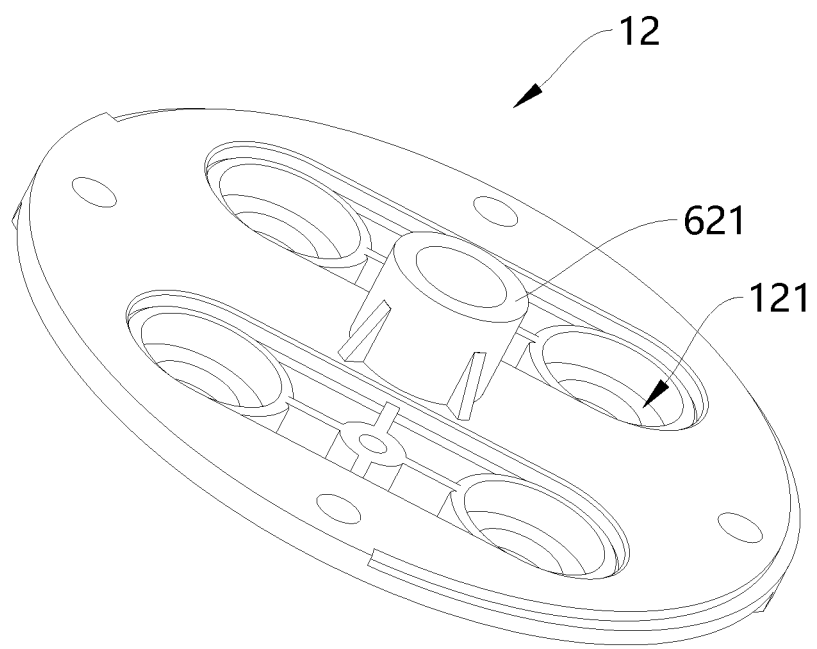
FIG. 8 is a schematic structural diagram of an upper valve cover of a reversing valve from a first perspective according to an implementation of the present disclosure.
Figure 9:
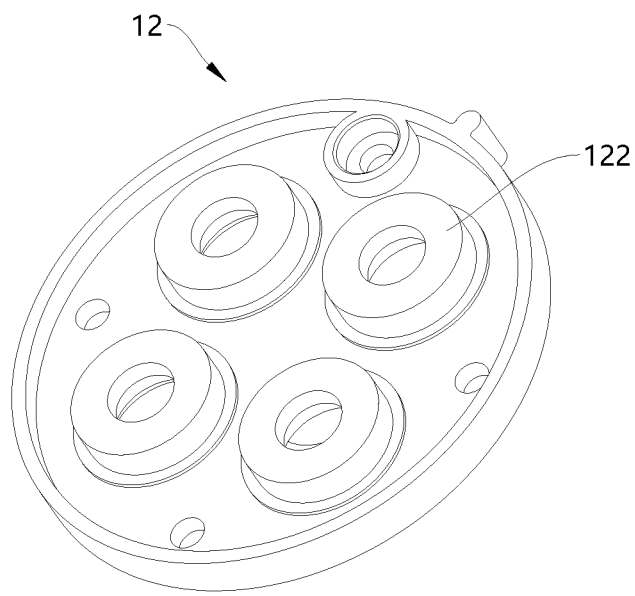
FIG. 9 is a schematic structural diagram of an upper valve cover of a reversing valve from a second perspective according to an implementation of the present disclosure.

As shown in FIG. 8 and FIG. 9, multiple upper cover blocking protrusions 122 are arranged on the upper valve cover 12, and the upper cover blocking protrusions 122 are engaged with the fluid distributors 41 in a one-to-one correspondence. A seal ring 2122 for the valve housing 14 is mounted to each of the upper cover blocking protrusions 122, which is configured to seal the upper cover blocking protrusion 122 and the fluid distributor 41 to prevent leakage. A rotating shaft support sleeve 621 for positioning during rotation of the actuating member 31 is arranged in a middle portion of the upper valve cover 12. The rotating shaft 311 of the actuating member 31 is inserted into the rotating shaft support sleeve 621. Multiple threaded posts are further arranged around the valve housing 14, and are configured to be fixedly connected with the upper valve cover 12.

Figure 11:
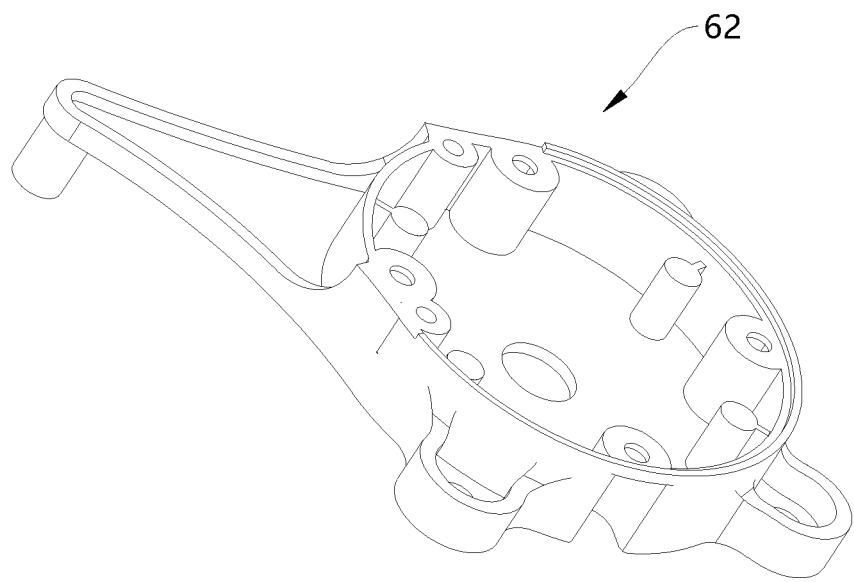
FIG. 11 is a schematic structural diagram of an actuator mounting base of a reversing valve according to an implementation of the present disclosure.

The actuator assembly 60 further includes an actuator mounting base 62 for accommodating the locking structure and the power device 61. Four round holes for fixing the valve housing 14 and the upper valve cover 12 by screws are arranged on a bottom of the actuator mounting base 62. As shown in FIG. 11, studs for fixing the upper valve cover 12 are arranged on the actuator mounting base 62. Four mounting bases for fixing the entire reversing valve 100 are arranged outside the actuator mounting base 62. Four mounting points may be directly fixed to a vehicle beam, or the reversing valve 100 may be mounted to an iron plate, and then the iron plate is fixed to the vehicle, which facilitates the mounting and fixing.

In order to perform flow distribution on a liquid flowing through the reversing valve, as shown in FIG. 12 to FIG. 22, a reversing valve 100 is provided in the present disclosure. The reversing valve 100 includes a valve body 10, a valve core assembly 20, and an actuating assembly 30. An inlet, at least two outlets, and an internal flow channel 40 that connects each inlet with each outlet are formed on the valve body 10. That is to say, the same inlet may be in communication with multiple outlets. A valve port 11 engaged with the valve core assembly 20 is formed on the internal flow channel 40. The valve port 11 is engaged with the valve core assembly 20 in a one-to-one correspondence, so as to allow or prevent, through the valve core assembly 20, passage of a fluid in the internal flow channel 40 where the valve port 11 is arranged. The valve core assembly 20 is movably arranged on the valve body 10. The actuating assembly 30 is configured to actuate the valve core assembly 20, so that the inlet is selectively in complete communication with one of the outlets or in partial communication with all of the multiple outlets, so as to realize the flow distribution by adjusting the cross sectional flow area at the corresponding valve port 11.

The "complete communication" in the present disclosure means communication in a case that the valve port 11 is completely opened and a maximum flow area is formed at the valve port 11.

According to the above technical solution, the actuating assembly 30 causes the valve core assembly 20 to block the valve port 11 or to be separated from the valve port 11, so as to allow or prevent passage of a fluid in the internal flow channel 40. In this way, the inlet and the outlet on the internal flow channel 40 are blocked or in complete communication, thereby realizing the function of switching the flow direction of the liquid. Alternatively, multiple valve core assemblies 20 partially open the corresponding valve ports 11 through the control of the valve core assemblies 20 by the actuating assembly 30, so that the same inlet can be in communication with all of the multiple outlets. In addition, the valve core assembly 20 causes the cross sectional flow area at the valve port 11 to be changed by controlling an extent to which the valve port 11 is opened, so as to adjust the flow at the valve port 11. Therefore, by changing the cross sectional flow area at a different valve port 11 of the internal flow channel 40 in communication with the same inlet, the flow distribution can be performed on the liquid flowing into the inlet. Therefore, the reversing valve 100 can be used to distribute the cooling liquid outputted from the PTC heater to the power battery pack and the heater core body respectively according to the required flow.

In the present disclosure, the reversing valve 100 applicable to a thermal management cooling circulation system of a vehicle is used as an example for description. It may be understood that the reversing valve 100 in the present disclosure may further be applied to other occasions where fluid distribution is required or a flow direction of a liquid needs to be changed, for example, a hydraulic system, an air conditioning system, a circulation system, and the like.

In order to allow or prevent passage of a fluid in the internal flow channel 40, in an implementation of the present disclosure, as shown in FIG. 13 to FIG. 17, a corresponding fluid distributor 41 is formed on the internal flow channel 40. A first accommodating cavity 411 and a second accommodating cavity 412 are formed on each fluid distributor 41. The first accommodating cavity 411 is always in communication with the inlet on the internal flow channel 40 where the first accommodating cavity is located. The second accommodating cavity 412 is always in communication with the outlet on the internal flow channel 40 where the second accommodating cavity is located. The first accommodating cavity 411 is in communication with the second accommodating cavity 412 through the valve port 11. Therefore, the valve core assembly 20 is controlled by the actuating assembly 30 to block the valve port 11 or to be separated from the valve port 11, so that the first accommodating cavity 411 and the second accommodating cavity 412 are blocked or in communication with each other, and then the corresponding inlet and outlet are blocked or in communication with each other. In addition, an extent to which the valve port 11 is opened is controlled to change the cross sectional flow area at the valve port 11, so as to adjust the flow at the valve port 11.

Figure 14:
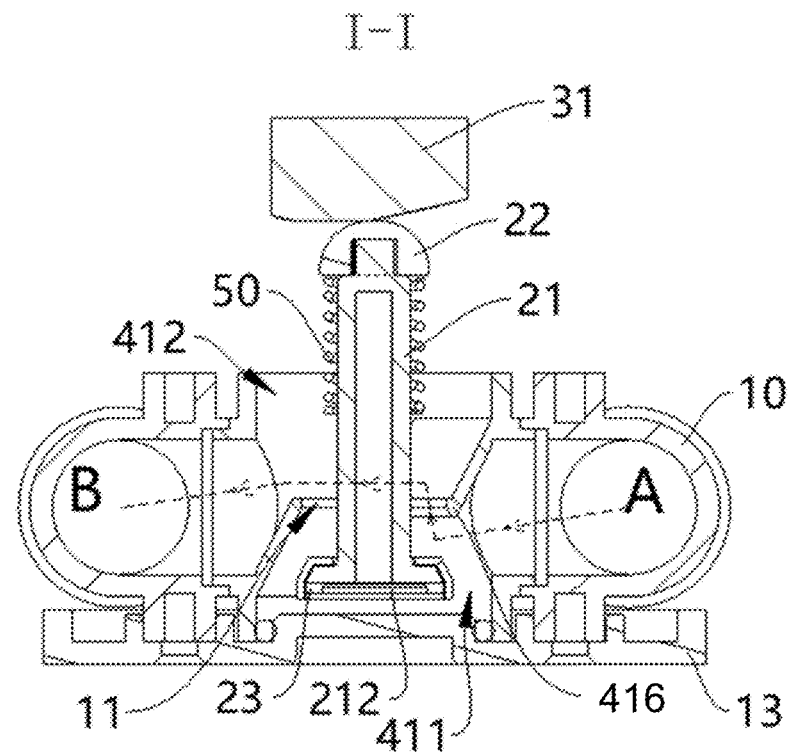
FIG. 14 is a schematic cross-sectional view along I-I in FIG. 2 and shows a flow direction of a liquid from an inlet A to an outlet B by a dashed arrow.
Figure 15:
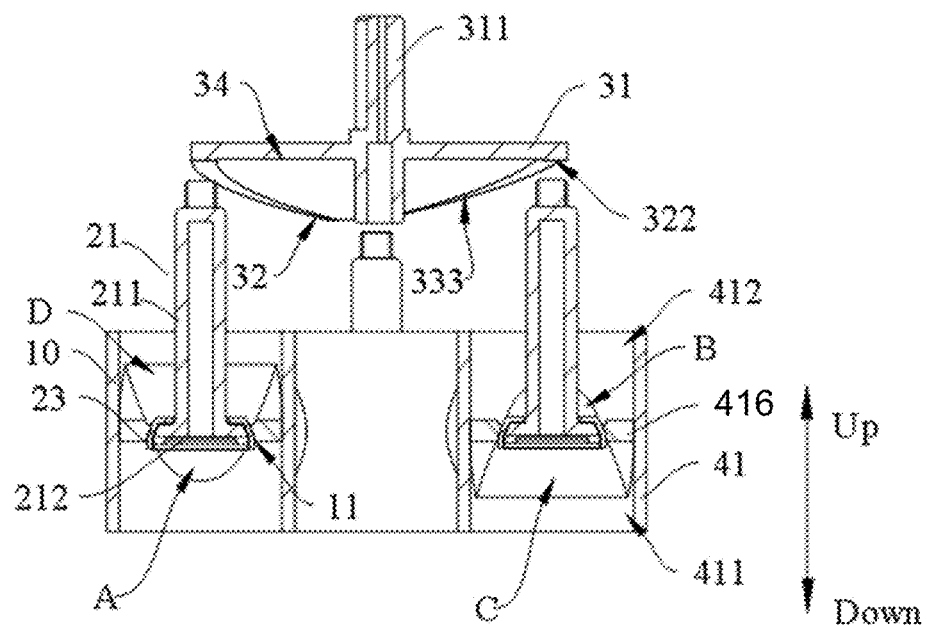
FIG. 15 is a schematic cross-sectional view taken along line II-II in FIG. 2.
Figure 16:
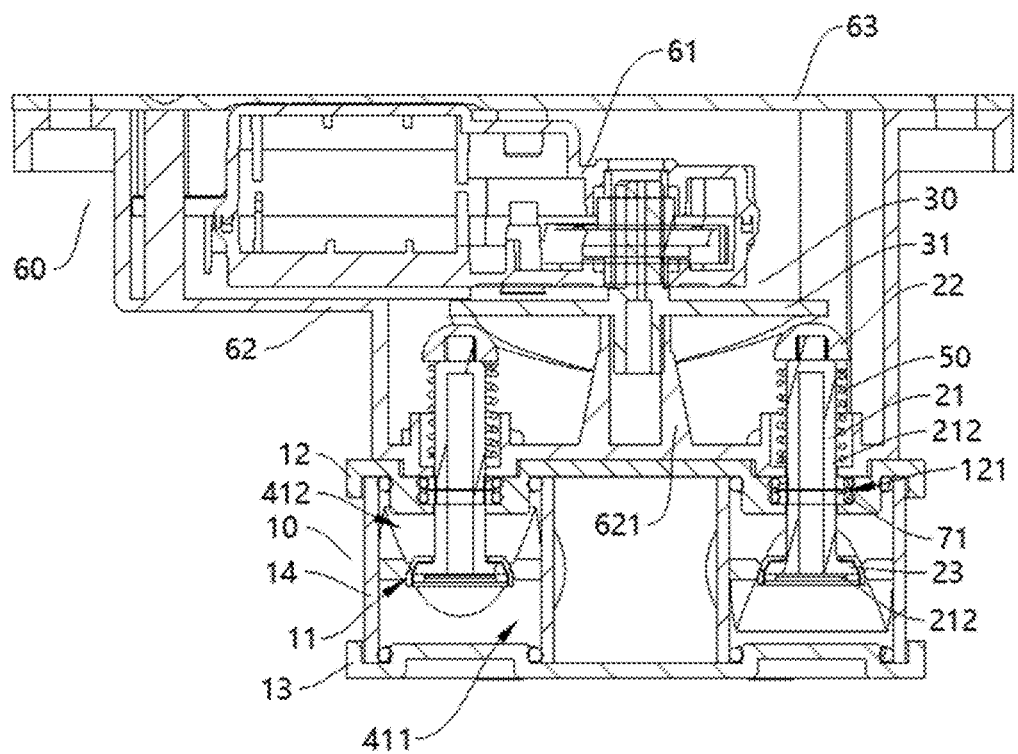
FIG. 16 is a schematic cross-sectional view of a reversing valve according to an implementation of the present disclosure.
Figure 17:
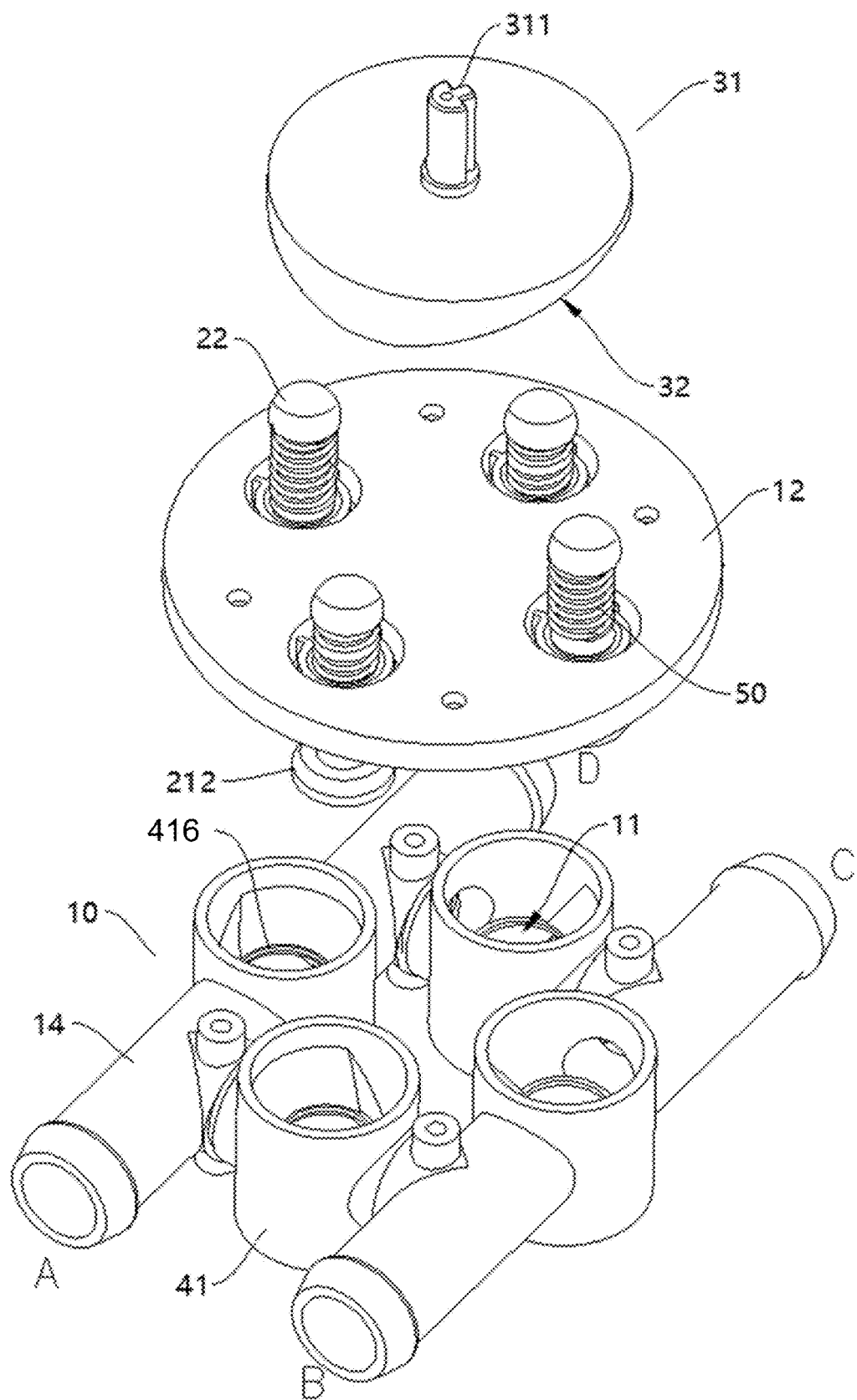
FIG. 17 is a schematic exploded view of a partial structure of a reversing valve according to an implementation of the present disclosure.
Figure 18:
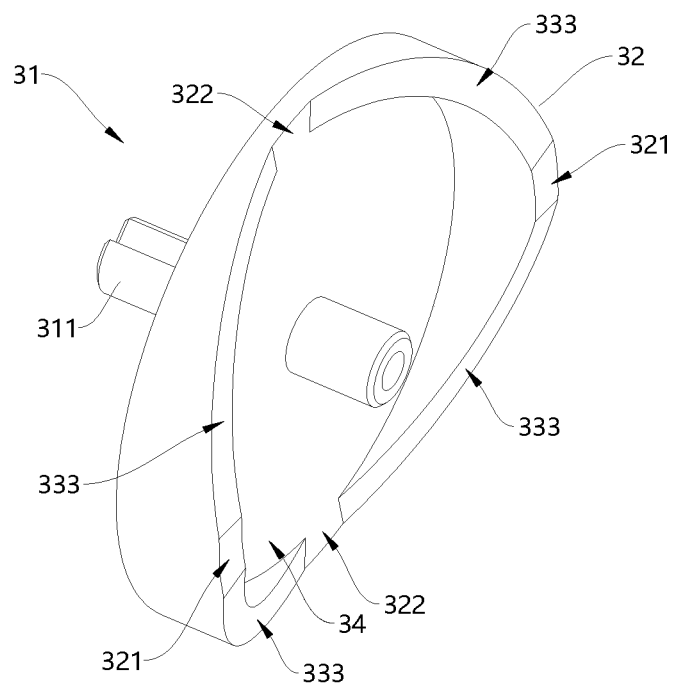
FIG. 18 is a schematic structural diagram of an actuating member of a reversing valve according to an implementation of the present disclosure.

In the present disclosure, how to form the first accommodating cavity 411 and the second accommodating cavity 412 in the fluid distributor 41 is not limited, which may be arranged as required. In an implementation, as shown in FIG. 14 to FIG. 16, a separation plate 416 is arranged in the fluid distributor 41. The separation plate 416 separates the fluid distributor 41 into the first accommodating cavity 411 and the second accommodating cavity 412. The valve port 11 is formed on the separation plate 416. The fluid distributor 41 is generally configured as a hollow cylindrical structure, and the separation plate 416 is arranged in the cylindrical structure to separate the fluid distributor into the first accommodating cavity 411 and the second accommodating cavity 412. The valve port 11 is a through hole formed on the separation plate 416. Therefore, the first accommodating cavity 411 and the second accommodating cavity 412 can be blocked or in communication with each other by blocking or moving away from the valve port 11 by the valve core assembly 20.

In an embodiment, a notch in communication with the inlet is formed on a side wall of the first accommodating cavity 411, and a notch in communication with the outlet is formed on a side wall of the second accommodating cavity 412.

In other implementations, a separation cylinder is arranged in the fluid distributor 41 to separate the fluid distributor 41 into the first accommodating cavity 411 and the second accommodating cavity 412. An accommodating cavity in the separation cylinder is the first accommodating cavity 411, and an accommodating cavity between the separation cylinder and an inner wall of the fluid distributor 41 is the second accommodating cavity 412. The first accommodating cavity 411 is always in communication with the inlet on the internal flow channel 40 where the first accommodating cavity is located. The second accommodating cavity 412 is always in communication with the outlet on the internal flow channel 40 where the second accommodating cavity is located. The valve port 11 is formed as an opening of the separation cylinder, and the first accommodating cavity 411 is in communication with the second accommodating cavity 412 through the valve port 11.

In an embodiment, in order to make the valve core assembly 20 to block the valve port 11 more tightly, in an implementation, as shown in FIG. 14 to FIG. 16 and FIG. 19, the valve core assembly 20 includes a blocking portion 212 configured to block the valve port 11. The blocking portion 212 is arranged in the first accommodating cavity 411. A diameter of the blocking portion 212 is greater than a diameter of the valve port 11. The first accommodating cavity 411 is always in communication with the inlet. The pressure of the liquid flowing into the first accommodating cavity 411 from the inlet causes the blocking portion 212 to be pressed against the valve port 11 on the valve port 11, so that the blocking portion 212 and the separation plate 416 can be engaged with each other more tightly, and leakage is less likely to occur. When the pressure is relatively high, the blocking portion 212 on the valve core rod 21 is pressed tightly and sealed, which greatly increases a pressure value of internal leakage and can fully satisfy a requirement for a pressure difference in an air conditioning system of a vehicle.

In other implementations, the elastic member 50 is connected between the valve body 10 and the valve core rod 21 to provide the elastic force for causing the valve core rod 21 to open the valve port 11, and the blocking portion 212 is located in the second accommodating cavity 412. A diameter of the blocking portion 212 is greater than a diameter of the valve port 11. The second accommodating cavity 412 is in communication with the outlet, and the first accommodating cavity 411 is always in communication with the inlet. Through a pressure of the liquid flowing into the first accommodating cavity 411 from the inlet, a pressure of the blocking portion 212 away from the valve port 11 on the separation plate 416 is provided, so as to assist the elastic member 50 in opening the blocking portion 212. Therefore, when the elastic force of the elastic member 50 is insufficient, the valve port 11 can still be opened normally, thereby improving the reliability of the reversing valve 100.

No limitation is imposed on how the actuating assembly 30 moves the valve core assembly 20 in the present disclosure, as long as the actuating assembly can move the valve core assembly 20. For example, a linear power source (a linear motor, a hydraulic cylinder, a pneumatic cylinder, or the like) may be arranged at each valve core assembly 20 to drive the valve core assembly 20 to move.

In an embodiment, in an implementation of the present disclosure, as shown in FIG. 14 and FIG. 16, the actuating assembly 30 includes an actuating member 31 and an elastic member 50. The valve core assembly 20 includes a valve core rod 21 movably extending through the valve body 10 along an axial direction of the valve core assembly. The elastic member 50 is connected between the valve body 10 and the valve core rod 21 to provide an elastic force for causing the valve core rod 21 to block the valve port 11. The actuating member 31 acts on the valve core rod 21, so that the valve core rod 21 overcomes the elastic force and gradually opens the valve port 11, thereby changing the cross sectional flow area at the valve port 11.

The direction shown in and FIG. 14 is used as an example for description. The valve core rod 21 moves upward to block the valve port 11, and the valve core rod 21 moves downward to be separated from the valve port 11. The elastic member 50 and the actuating member 31 act on the valve core rod 21. When the valve port 11 is required to be closed, the actuating member 31 reduces or releases the acting force on the valve core rod 21. The elastic member 50 causes the valve core rod 21 to move upward, and the blocking portion 212 blocks the valve port 11, thereby closing the valve port 11. When the valve port 11 is required to be opened, the actuating member 31 acts on the valve core rod 21 so that the valve core rod 21 overcomes the elastic force to move away from the valve port 11, thereby opening the valve port 11. In addition, a moving distance of the valve core rod 21 may be controlled by the actuating member 31, so that the valve core rod 21 gradually overcomes the acting force of the elastic member 50. An extent to which the valve port 11 is opened is adjusted to change the cross sectional flow area at the valve port 11. In this way, the flow in the corresponding internal flow channel 40 is adjusted.

The elastic member 50 may be a compression spring, or may be a common spring, an elastic rubber member, an elastic silicone member, an elastic sheet, or other elastic mechanisms.

An existing electric valve generally has defects such as a large rotational torque, an excessively large operating current, breaking of the rotating shaft 311, and the like. The reversing valve 100 in the present disclosure drives four valve core rods 21 to move up and down through the actuating member 31, which requires a small frictional force and a small required operating current and extends the service life of a product.

The actuating member 31 should not be limited to any specific structures in the present disclosure, as long as the valve core rod 21 can be actuated to move. In an embodiment, in an implementation, as shown in FIG. 13 and FIG. 15 to FIG. 18, the actuating member 31 is rotatably arranged on the valve body 10, and an arcuate guide surface 32 is arranged on a side of the actuating member 31 facing the valve core rod 21. The arcuate guide surface 32 has a first guide portion 321 and a second guide portion 322 with different heights, and a gradual transition is realized between the first guide portion 321 and the second guide portion 322 through a smooth surface. A guide path 333 is formed between the first guide portion 321 and the second guide portion 322, and a top end of the valve core rod 21 slidably abuts against the corresponding guide path 333 to jointly form a cam transmission mechanism. When the first guide portion 321 abuts against the top end of the valve core rod 21, the valve core rod 21 overcomes the elastic force and opens the valve port 11. When the second guide portion 322 abuts against the top end of the valve core rod 21, the elastic member 50 causes the valve core rod 21 to block the valve port 11. The top end of the valve core rod 21 is an end of the valve core rod 21 close to the actuating member 31. The arcuate guide surface 32 of the actuating member 31 is generally configured as a circular wavy structure. A rotating shaft 311 further protrudes from a side of the actuating member 31 facing the valve body 10, and the actuating member 31 is rotatable around the rotating shaft 311.

The first guide portion 321 and the second guide portion 322 respectively protrude from a reference plane 34 of the actuating member 31, and the "height" is a height by which the guide portion protrudes from the reference plane 34 of the actuating member 31. The first guide portion 321 has a maximum height on the guide path 333, and the second guide portion 322 has a minimum height on the guide path 333.

During rotation of the actuating member 31, the top end of the valve core rod 21 slides along the guide path 333. When the top end of the valve core rod 21 abuts against the first guide portion 321, a distance between the blocking portion 212 on the valve core rod 21 and the valve port 11 is largest, and the valve port 11 is opened to the maximum extent. In this case, the valve port 11 is in a completely opened state, the cross sectional flow area at the valve port 11 is the largest, and the corresponding inlet is in complete communication with the outlet. When the top end of the valve core rod 21 slides to the second guide portion 322 along the guide path 333, the elastic member 50 causes the blocking portion 212 on the valve core rod 21 to block the valve port 11. In this way, the valve port 11 is blocked. When the top end of the valve core rod 21 abuts against the guide path 333 between the first guide portion 321 and the second guide portion 322, the valve port 11 is partially opened, and the extent to which the valve port 11 is opened depends on the height of the guide path 333 against which the valve core rod 21 abuts at this time. Since a gradual transition is realized between the first guide portion 321 and the second guide portion 322 through a smooth surface, the valve port 11 is gradually opened or gradually closed during the rotation of the actuating member 31. Correspondingly, the extent to which the valve port 11 is opened also progressive changes, so that the flow of a liquid flowing through the valve port 11 changes gradually. In this way, the flow in an internal flow channel 40 can be gradually changed, thereby performing flow distribution more accurately.

In an embodiment, in other implementations, the actuating member 31 is movably arranged on the valve body 10. The movement of the actuating member 31 is realized through engagement of a gear and a rack. An inclined guide surface is arranged on a bottom surface of the actuating member 31. When the inclined guide surface moves along a horizontal direction, the valve core rod 21 is pushed to move through engagement of the inclined guide surface and the top end of the valve core rod 21, thereby allowing or preventing passage of a fluid in the internal flow channel 40.

In an embodiment, a gradual transition is realized between the first guide portion 321 and the second guide portion 322 through an inclined surface, so as to realize the progressive change of the flow. In other implementations, a gradual transition may further be realized between the first guide portion 321 and the second guide portion 322 through an arcuate surface.

A specific shape of the arcuate guide surface 32 is not limited in the present disclosure, and may be set according to a moving distance and direction of the valve core rod 21 to be actuated. In an embodiment, the arcuate guide surface 32 includes two first guide portions 321 and two second guide portions 322. The two first guide portions 321 are symmetric with respect to a center of the rotating shaft 311 of the actuating member 31, and the two second guide portions 322 are symmetric with respect to the center of the rotating shaft 311 of the actuating member 31. The two first guide portions 321 and the two second guide portions 322 are spaced apart. Projections of the first guide portions and the second guide portions along an axial direction are located on a same circumference. The first guide portions and the second guide portions jointly form four guide paths 333. Each of the guide paths 333 is engaged with the valve core rod 21.

The guide portions are arranged symmetrically with respect to the center of the rotating shaft 311 of the actuating member 31, so that the acting force of the valve core rod 21 on the actuating member 31 can be more balanced and is not easy to skew, and the valve core rod 21 is not easily deformed. In this way, the internal leakage does not occur, and the cooling or heating effect of a thermal management system is improved.

In an embodiment, the projections of the four guide paths 333 along the axial direction are located on the same circumference, so that the top end of the valve core rod 21 can always move along the guide path 333 when the actuating member 31 rotates along the rotating shaft 311.

In an embodiment, each two of the four guide portions are spaced apart from each other at an angle of 90°. In this way, when the actuating member 31 rotates by 90 degrees, the valve core rod 21 engaged with the first guide portion 321 is switched to be engaged with the second guide portion 322, and the valve core rod 21 engaged with the second guide portion 322 is switched to be engaged with the first guide portion 321.

Figure 13:
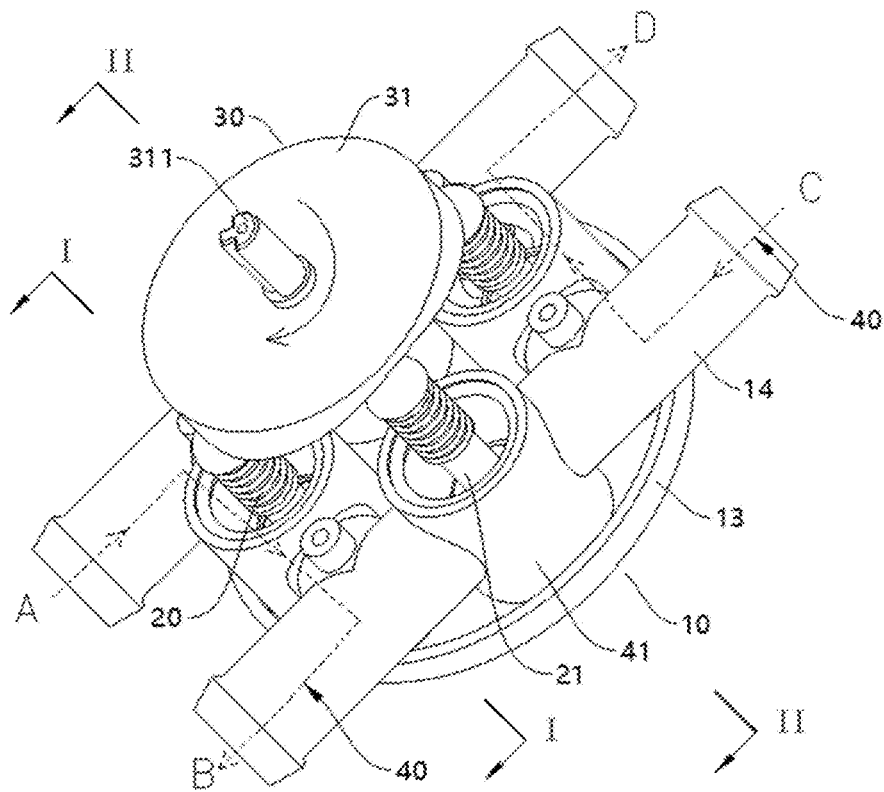
FIG. 13 is a partial three-dimensional schematic structural diagram of a reversing valve according to an implementation of the present disclosure and shows flow directions of liquids from an inlet A to an outlet B and from an inlet C to an outlet D by a dashed arrow.

In the present disclosure, a quantity of inlets and outlets specifically arranged on the valve body 10 is not limited, and can be set as required. In an embodiment, in an implementation of the present disclosure, as shown in FIG. 13, two inlets, that is, an inlet A and an inlet C and two outlets, that is, an outlet B and an outlet D are formed on the valve body 10. The inlet A is in communication with the outlet B to form a first internal flow channel 40 and is in communication with the outlet D to form a second internal flow channel 40. When one of the two valve core rods 21 engaged with the first internal flow channel 40 and the second internal flow channel 40 is engaged with the first guide portion 321, the other of the valve core rods 21 is engaged with the second guide portion 322. Therefore, during the rotation of the actuating member 31, the valve core rods 21 in different flow channels in communication with a same inlet move in different directions.

The inlet C is in communication with the outlet B to form a third internal flow channel 40 and is in communication with the outlet D to form a fourth internal flow channel 40. When one of the two valve core rods 21 engaged with the third internal flow channel 40 and the fourth internal flow channel 40 is engaged with the first guide portion 321, the other of the valve core rods 21 is engaged with the second guide portion 322. Therefore, during the rotation of the actuating member 31, the valve core rods 21 in different flow channels in communication with the same inlet move in different directions.

The flow direction of the liquid flowing into the inlet A is used for description. Assuming that in an initial state, the valve core rod 21 in the first internal flow channel 40 is engaged with the first guide portion 321, the first guide portion 321 presses against the blocking portion 212 on the valve core rod 21 to move away from the valve port 11. In this case, the valve port 11 in the first internal flow channel 40 is completely opened, and the inlet A and the outlet B are in complete communication. In the meantime, the valve core rod 21 in the second internal flow channel 40 is engaged with the second guide portion 322, and the elastic member 50 causes the blocking portion 212 on the valve core rod 21 to block the valve port 11 in the second internal flow channel 40. In this case, the second internal flow channel 40 is blocked, and the inlet A and the outlet D are blocked. Therefore, the liquids flowing into the valve body 10 from the inlet A all flow out from the outlet B.

During the rotation of the actuating member 31, the valve core rod 21 slides along the guide path 333, the blocking portion 212 on the valve core rod 21 engaged with the first internal flow channel 40 gradually moves close to the valve port 11, and the valve port 11 is gradually closed. The cross sectional flow area at the valve port 11 gradually decreases, and the flow of the liquid flowing through the valve port 11 gradually decreases, so that the flow of the liquid flowing out from the outlet B gradually decreases. In the meantime, the blocking portion 212 on the valve core rod 21 engaged with the second internal flow channel 40 gradually moves away from the valve port 11, and the valve port 11 is gradually opened. The cross sectional flow area at the valve port 11 gradually increases, and the flow of the liquid flowing through the valve port 11 gradually increases, so that the outlet D is gradually opened, and the flow of the liquid flowing out from the outlet D gradually increases. In this way, the required flow distribution can be performed on the liquids flowing into the inlet A and out of the outlet B and the outlet D.

When the actuating member 31 continues to rotate, the valve core rod 21 in the first internal flow channel 40 is engaged with the second guide portion 322, and the elastic member 50 causes the blocking portion 212 on the valve core rod 21 to block the valve port 11 in the first internal flow channel 40. In this case, the first internal flow channel 40 is blocked, and the inlet A and the outlet B are blocked. In the meantime, the valve core rod 21 in the second internal flow channel 40 is engaged with the first guide portion 321, and the first guide portion 321 pushes the blocking portion 212 on the valve core rod 21 to move away from the valve port 11. In this case, the valve port 11 in the second internal flow channel 40 is completely opened, and the inlet A and the outlet D are in complete communication, so as to switch the flow direction of the liquid. That is to say, the communication between the inlet A and the outlet B is switched to communication between the inlet A and the outlet D.

In some embodiments of the present disclosure, as shown in FIG. 6, an annular protrusion 35 is arranged on the actuating member 31 around the rotating shaft 311. The actuating member 31 further includes a reinforcing rib 36. One end of the reinforcing rib 36 is connected with the annular protrusion 35, and another end of the reinforcing rib 36 is connected with a side wall of the guide path 333. In this way, the structural strength of the actuating member 31 is effectively improved, and the service life of the actuating member 31 is extended at least to a certain extent.

Further, two sets of reinforcing ribs 36 are arranged. Each set of reinforcing ribs 36 include multiple reinforcing ribs arranged at intervals in a circumferential direction. One set of reinforcing ribs 36 are located on one side of a line connecting the two second guide portions 322, and the other set of reinforcing ribs 36 are located on an other side of the line connecting the two second guide portions 322. In this way, a relatively high side wall of the guide path 333 is fully utilized, and the utilization of a space defined by side walls of the guide path 333 is maximized.

It may be understood that the principle of the flow distribution of the liquid flowing into the inlet C is similar to the principle of the flow distribution of the liquid flowing into the inlet A. Details are not described herein again.

Figure 12:
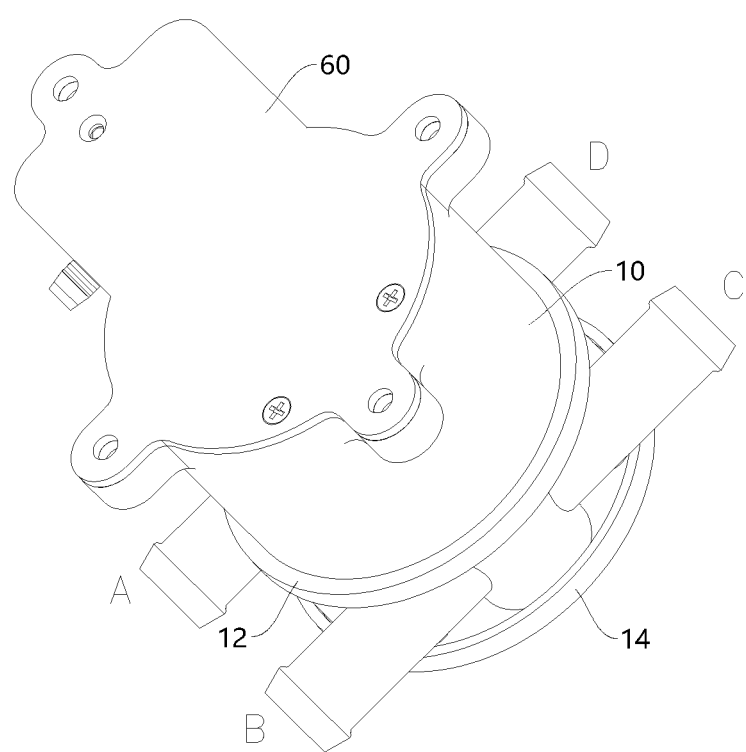
FIG. 12 is a three-dimensional schematic structural diagram of a reversing valve according to an implementation of the present disclosure.

Specific extension directions of the inlet and the outlet are not limited in the present disclosure, and may be set according to an actual mounting requirement. In an embodiment, in an implementation, as shown in FIG. 12 and FIG. 13, the inlet A and the outlet D are arranged coaxially, the outlet B and the inlet C are arranged coaxially, the inlet A and the outlet B are arranged in parallel, and the inlet A and the inlet C are formed on different side surfaces of the valve body 10. In an embodiment, the inlet A and the outlet B are formed on a same side of the valve body 10, and the inlet C and the outlet D are formed on a same side of the valve body 10. The arrangement of the above parallel structure facilitates the connection between the reversing valve 100 and a pipeline.

Figure 20:
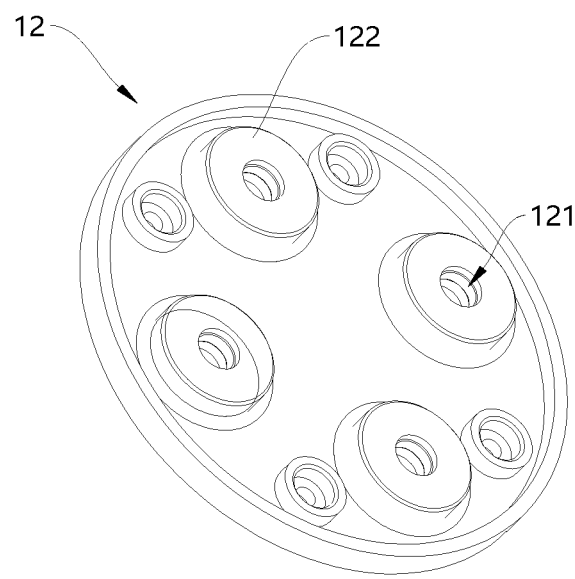
FIG. 20 is a schematic structural diagram of an upper valve cover of a reversing valve according to an implementation of the present disclosure.
Figure 21:
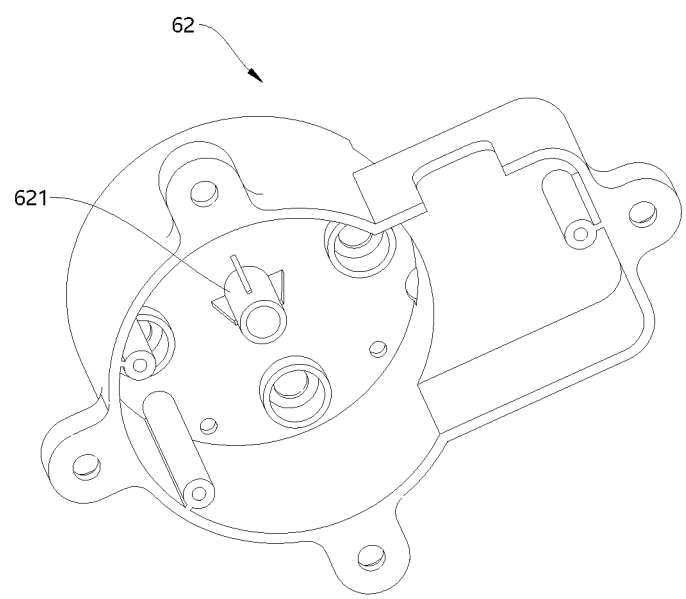
FIG. 21 is a schematic structural diagram of an actuator mounting base of a reversing valve according to an implementation of the present disclosure.

In order to prevent the liquid in the internal flow channel 40 from leaking from the valve core rod 21, in an implementation, as shown in FIG. 16 and FIG. 20, the valve core assembly 20 includes the valve core rod 21 movably extending through the valve body 10 along the axial direction of the valve core assembly. A stepped hole 121 is arranged on the valve body 10. The top end of the valve core rod 21 extends through the stepped hole 121. A sealing member 71 is fixedly arranged in the stepped hole 121 to seal the valve core rod 21 and the valve body 10. The stepped hole 121 guides the movement of the valve core rod 21. The stepped hole 121 is arranged on a top end of the valve body 10. In an embodiment, the sealing member 71 may be a seal ring.

Compared with a ball valve used in the related art, the flow direction of the liquid is switched by rotating a spherical valve core in the valve body 10, and a rubber sealing member 71 having a larger area is required to seal the valve core and the valve body 10. Due to a relatively large contact area between the spherical valve core and the valve body 10, the abrasion is likely to occur during long-term sliding friction, and leakage is likely to occur after long-term use. In the present disclosure, since the valve core rod 21 is slidably arranged on the valve body 10 along a linear direction, the sealing of a position where the valve core rod 21 is engaged with the valve body 10 can be realized by sealing a position where the valve core rod 21 extends through the valve body 10. A contact area between the valve core rod 21 and the sealing member 71 is relatively small, which can reduce the friction force between the valve core rod and the sealing member, reduce abrasion, and reduce leakage caused by the abrasion of the sealing member 71. In this way, no internal leakage occurs, and the cooling or heating effect of the thermal management system is improved.

Figure 19:
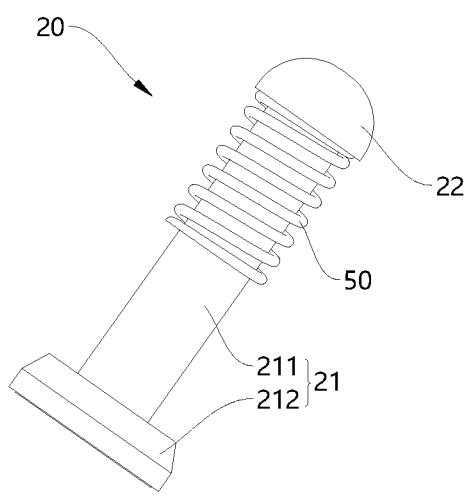
FIG. 19 is a schematic structural diagram of a valve core assembly of a reversing valve according to an implementation of the present disclosure.

A specific structure of the valve core assembly 20 is not limited in the present disclosure, as long as the valve core rod 21 can be pushed to move. In an implementation, as shown in FIG. 16 and FIG. 19, the valve core assembly 20 further includes a valve core cap 22 and a valve core sleeve 23. The valve core rod 21 is configured as a T-shaped structure formed by a shaft rod portion 211 and the blocking portion 212. The shaft rod portion 211 movably extends through the valve body 10, and the valve core cap 22 is fixedly arranged on an end of the shaft rod portion 211 away from the blocking portion 212. The valve core cap 22 is opened from the valve body 10, the elastic member 50 is sleeved on the shaft rod portion 211, and the elastic member 50 abuts between the valve core cap 22 and the valve body 10, so as to apply an elastic force to the valve core rod 21, so that the blocking portion 212 can block the valve port 11. The valve core sleeve 23 is fixedly wrapped around the blocking portion 212 to seal the blocking portion 212 and the valve port 11. The valve core sleeve 23 may be made of an elastic material such as a rubber material. The valve core cap 22 may be threadedly mated with a top end of the shaft rod portion 211.

In an embodiment, a peripheral surface of the valve core sleeve 23 may be configured as a conical surface structure. Therefore, when the blocking portion 212 blocks the valve port 11, the valve port 11 can be blocked more tightly through engagement of the conical surface structure and the valve port 11. The valve core cap 22 is a hemispherical structure, which facilitates sliding of the valve core cap 22 on the arcuate guide surface 32.

In an embodiment, in other implementations, the valve core cap 22 may further be a roller with a fixing seat, a rolling shaft, and the like. The fixing seat is connected with the shaft rod portion 211, and the roller or the rolling shaft rolls on the arcuate guide surface 32 to reduce the frictional force between the valve core cap and the arcuate guide surface.

In order to drive the actuating assembly 30 to move, in the present disclosure, as shown in FIG. 16, the reversing valve 100 further includes an actuator assembly 60. The actuator assembly 60 includes a locking structure and a power device 61. The power device 61 is drive-connected with the actuating assembly 30 through the locking structure, so as to drive the actuating assembly 30 to move, and the locking structure is configured to lock the actuating assembly 30 in its current state. The power device 61 may include a stepping motor, and the locking structure may be a worm gear structure and performs self-locking by using self-locking features of the worm gear.

By arranging the actuator assembly 60, when the flow distribution is required, the actuating member 31 may be locked at a certain angle by the locking structure, so that the corresponding valve core rod 21 is in a corresponding opened state. Alternatively, the valve core rod 21 is locked by the locking structure to be engaged with the first guide portion 321 or the second guide portion 322, so that the valve port 11 is kept in a completely opened or blocked state.

In an embodiment, as shown in FIG. 16, the valve body 10 includes an upper valve cover 12, a valve housing 14, and a lower valve cover 13. The internal flow channel 40 is formed in the valve housing 14, two ends of the fluid distributor 41 are open, and the upper valve cover 12 and the lower valve cover 13 respectively cover the openings on both ends of the fluid distributor 41. The valve core assembly 20 slidably extends through the upper valve cover 12, the stepped hole 121 is arranged on the upper valve cover 12, and a sealing member 71 is fixedly arranged in the stepped hole 121 to seal the valve core assembly 20 and the upper valve cover 12. As shown in FIG. 20, multiple upper cover blocking protrusions 122 are arranged on the upper valve cover 12, and the upper cover blocking protrusions 122 are engaged with the fluid distributors 41 in a one-to-one correspondence. That is to say, each of the upper cover blocking protrusions 122 and a lower cover blocking protrusion 131 respectively block two ends of each of the fluid distributors 41. A seal ring for the valve housing 14 is mounted to each of the upper cover blocking protrusions 122, which is configured to seal the upper cover blocking protrusion 122 and the fluid distributor 41 to prevent leakage.

Figure 22:
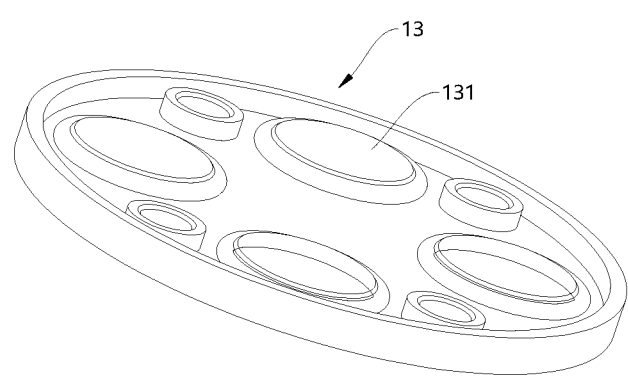
FIG. 22 is a schematic structural diagram of a lower valve cover of a reversing valve according to an implementation of the present disclosure.

In an implementation, in order to ensure the sealing between the lower valve cover 13 and the valve housing 14, as shown in FIG. 22, multiple lower cover blocking protrusions 131 are arranged on the lower valve cover 13. The lower cover blocking protrusions 131 are engaged with the fluid distributors 41 in a one-to-one correspondence. A seal ring for the valve housing 14 is mounted to each of the lower cover blocking protrusions 131 to seal the lower cover blocking protrusion 131 and the fluid distributor 41 to prevent leakage. In an embodiment, multiple annular groove protrusions are further arranged on the lower valve cover, and are configured to be engaged with the grooves on the valve housing 14 to position and fix the valve housing 14. Multiple threaded posts are further arranged around the valve housing 14, and are configured to be fixedly connected with the lower valve cover 13 and the upper valve cover 12.

The actuator assembly 60 further includes an actuator mounting base 62 configured to accommodate the locking structure and the power device 61. An opening is formed above an accommodating cavity of the actuator mounting base 62, and the opening is closed by an actuator cover plate 63. Four round holes for fixing the valve housing 14 and the upper valve cover 12 by screws are arranged on a bottom of the actuator mounting base 62. As shown in FIG. 16, four upwardly protruding annular grooves are further arranged on the bottom of the actuator mounting base 62, and the elastic member 50 extends through the upper valve cover 12 and the annular grooves, so as to limit and guide the elastic member 50. A rotating shaft support sleeve 621 for positioning during rotation of the actuating member 31 is arranged in a middle portion of the actuator mounting base 62. The rotating shaft 311 of the actuating member 31 is inserted into the rotating shaft support sleeve 621. Studs for fixing the upper valve cover 12 are arranged on the actuator mounting base 62. Four mounting bases for fixing the entire reversing valve 100 are arranged outside the actuator mounting base 62. Four mounting points may be directly fixed to a vehicle beam, or the reversing valve 100 may be mounted to an iron plate, and then the iron plate is fixed to the vehicle, which facilitates the mounting and fixing.

Implementations of the present disclosure are described in detail above with reference to the accompanying drawings. However, the present disclosure is not limited to the specific details in the foregoing implementations. In the scope of the technical thinking of the present disclosure, many simple modifications can be performed on the technical solution of the present disclosure, and the simple modifications all belong to the protection scope of the present disclosure.

It should be further noted that the specific technical features described in the foregoing specific implementations can be combined in any appropriate manner provided that no conflict occurs. To avoid unnecessary repetition, various possible combination manners are not described in the present disclosure.

In addition, various different implementations of the present disclosure may also be combined randomly. The combinations should also be regarded as the disclosure of the present disclosure as long as the combinations do not violate the idea of the present disclosure.

What is claimed is:

1. An actuating member, comprising:
a guide surface on the actuating member having a rotating shaft; and
a guide path formed on the guide surface,
wherein the guide surface is configured to slidably abut against a top end of a valve core rod, so that the top end of the valve core rod selectively abuts against a position on the guide path at a different height, to adjust a position of the valve core rod in a valve port of a reversing valve to change a flow area at the valve port,
wherein the guide surface comprises two first guide portions disposed at highest portions of the guide surface and two second guide portions disposed at lowest portions of the guide surface, wherein the first guide portions are symmetric with each other with respect to a center of the rotating shaft, the second guide portions are symmetric with each other with respect to the center of the rotating shaft, and the first guide portions and the second guide portions are alternately disposed on the guide surface.

2. The actuating member according to claim 1, wherein the guide surface is an arcuate guide surface.

3. The actuating member according to claim 1, wherein each of the first guide portions is configured to abut against and be engaged with the top end of the valve core rod, and each of the second guide portions is configured to abut against and be engaged with the top end of the valve core rod, so that the valve core rod opens or blocks the valve port.

4. The actuating member according to claim 3, wherein each of the first guide portions is configured in such a way that the valve port is in a completely opened state when one of the first guide portions abuts against and is engaged with the top end of the valve core rod; and the valve core rod blocks the valve port when one of the second guide portions abuts against and is engaged with the top end of the valve core rod.

5. The actuating member according to claim 3, wherein a gradual transition is realized between one of the first guide portions and one of the second guide portions adjacent to each other, through a smooth surface.

6. The actuating member according to claim 5, wherein the smooth surface is an arcuate surface or an inclined surface.

7. The actuating member according to claim 1, wherein a cam transmission mechanism is jointly formed by the valve core rod and the actuating member; and the guide surface is an arcuate guide surface.

8. A reversing valve, comprising:
a valve body;
a valve core assembly; and
an actuating assembly,
wherein an inlet, at least two outlets, and an internal flow channel that connects the inlet with the outlets are formed on the valve body; a valve port engaged with the valve core assembly is formed on the internal flow channel; the valve port is in a one-to-one correspondence with the valve core assembly; the valve core assembly is movably arranged on the valve body; and the actuating assembly is configured to actuate the valve core assembly, so that the inlet is selectively in communication with at least one of the outlets, and flow distribution is realized by adjusting a cross sectional flow area at the valve port,
wherein the actuating assembly comprises an actuating member comprising:
a guide surface on the actuating member having a rotating shaft; and
a guide path formed on the guide surface,
wherein the guide surface is configured to slidably abut against a top end of a valve core rod of the valve core assembly, so that the top end of the valve core rod selectively abuts against a position on the guide path at a different height, to adjust a position of the valve core rod in the valve port to change a flow area at the valve port,
wherein the guide surface comprises two first guide portions disposed at highest portions of the guide surface and two second guide portions disposed at lowest portions of the guide surface, wherein the first guide portions are symmetric with each other with respect to a center of the rotating shaft, the second guide portions are symmetric with each other with respect to the center of the rotating shaft, and the first guide portions and the second guide portions are alternately disposed on the guide surface.

9. The reversing valve according to claim 8, wherein the actuating assembly is configured to actuate the valve core assembly, so that the inlet is selectively in complete communication with one of the outlets or in partial communication with all of the outlets, so as to realize the flow distribution by adjusting the cross sectional flow area at the valve port.

10. The reversing valve according to claim 8, wherein a fluid distributor is formed on the internal flow channel; a separation cylinder is arranged in the fluid distributor to separate the fluid distributor into a first accommodating cavity and a second accommodating cavity; the valve port is formed as an opening of the separation cylinder; the first accommodating cavity is in communication with the second accommodating cavity through the valve port; one of the first accommodating cavity and the second accommodating cavity is in communication with the inlet on the internal flow channel where such accommodating cavity is located; and the other of the first accommodating cavity and the second accommodating cavity is in communication with one of the outlets on the internal flow channel where such accommodating cavity is located.

11. The reversing valve according to claim 8, wherein the actuating assembly further comprises an elastic member; the valve core rod movably extends through the valve port; and the elastic member is connected between the valve body and the valve core rod to provide an elastic force for causing the valve core rod to open the valve port.

12. The reversing valve according to claim 11, wherein the actuating member is rotatably arranged on the valve body; the guide surface is an arcuate guide surface and a gradual transition is realized between one of the first guide portions and one of the second guide portions adjacent to each other through a smooth surface to jointly form a cam transmission mechanism, so that the valve core rod opens or blocks the valve port.

13. The reversing valve according to claim 12, wherein when the one of the first guide portions abuts against the top end of the valve core rod, the valve core rod overcomes the elastic force and opens the valve port; and when the one of the second guide portions abuts against the top end of the valve core rod, the elastic member causes the valve core rod to block the valve port.

14. The reversing valve according to claim 8, wherein the valve core assembly comprises the valve core rod movably extending through the valve body; a stepped hole is arranged on the valve body; and the top end of the valve core rod extends out through the stepped hole.

15. The reversing valve according to claim 8, wherein the valve core assembly comprises the valve core rod movably extending through the valve body along an axial direction of the valve core assembly; a stepped hole is arranged on the valve body; the top end of the valve core rod extends out through the stepped hole; and a sealing member is fixedly arranged in the stepped hole to seal the valve core rod and the valve body.

16. A reversing valve, comprising:
   a valve body having an inlet, a plurality of outlets, and an internal flow channel that connects the inlet with the plurality of outlets and includes a valve port;
   a valve core rod movable within the valve port; and
   an actuating member having a rotating shaft, an arcuate guide surface, and a guide path formed on the guide surface,
   wherein the guide surface is configured to slidably abut against a top end of a valve core rod, so that the top end of the valve core rod selectively abuts against a position on the guide path at a different height, to adjust a position of the valve core rod in the valve port to change a flow area at the valve port,
   wherein the guide surface comprises two first guide portions disposed at highest portions of the guide surface and two second guide portions disposed at lowest portions of the guide surface, wherein the first guide portions are symmetric with each other with respect to a center of the rotating shaft, the second guide portions are symmetric with each other with respect to the center of the rotating shaft, and the first guide portions and the second guide portions are alternately disposed on the guide surface.

17. The reversing valve according to claim 16, further comprising an elastic member connected between the valve body and the valve core rod to provide an elastic force to move the valve core rod within the valve port.

* * * * *